(12) United States Patent
Weber et al.

(10) Patent No.: US 8,825,633 B2
(45) Date of Patent: Sep. 2, 2014

(54) SYSTEM, METHOD, AND DATA STRUCTURE FOR AUTOMATICALLY GENERATING DATABASE QUERIES WHICH ARE DATA MODEL INDEPENDENT AND CARDINALITY INDEPENDENT

(75) Inventors: Thomas P. Weber, Apex, NC (US); Frederick J. Levine, Hillsborough, NC (US); James P. Kelley, Cary, NC (US)

(73) Assignee: SAS Institute Inc., Cary, NC (US)

( * ) Notice: Subject to any disclaimer, the term of this patent is extended or adjusted under 35 U.S.C. 154(b) by 182 days.

(21) Appl. No.: 13/471,548

(22) Filed: May 15, 2012

(65) Prior Publication Data

US 2013/0311442 A1    Nov. 21, 2013

(51) Int. Cl.
*G06F 7/00*     (2006.01)
*G06F 17/30*    (2006.01)

(52) U.S. Cl.
USPC .......................................................... 707/714

(58) Field of Classification Search
USPC .......................................................... 707/714
See application file for complete search history.

(56) References Cited

U.S. PATENT DOCUMENTS

| | | | |
|---|---|---|---|
| 4,497,039 A | 1/1985 | Kitakami et al. |
| 4,811,207 A | 3/1989 | Hikita et al. |
| 5,121,494 A | 6/1992 | Dias et al. |
| 5,241,648 A | 8/1993 | Cheng et al. |
| 5,421,008 A | 5/1995 | Banning et al. |
| 5,553,218 A | 9/1996 | Li et al. |
| 5,557,791 A | 9/1996 | Cheng et al. |
| 5,590,319 A | 12/1996 | Cohen et al. |
| 5,659,725 A | 8/1997 | Levy et al. |
| 5,680,603 A | 10/1997 | Bhargava et al. |
| 5,721,900 A | 2/1998 | Banning et al. |
| 5,721,901 A | 2/1998 | Banning et al. |
| 5,802,357 A | 9/1998 | Li et al. |
| 5,842,209 A | 11/1998 | Mocek et al. |
| 5,983,215 A | 11/1999 | Ross et al. |
| 6,041,344 A | 3/2000 | Bodamer et al. |
| 6,105,020 A | 8/2000 | Lindsay et al. |
| 6,167,399 A | 12/2000 | Hoang |
| 6,356,896 B1 | 3/2002 | Cheng et al. |
| 6,374,235 B1 | 4/2002 | Chen et al. |
| 6,385,603 B1 | 5/2002 | Chen et al. |
| 6,397,204 B1 | 5/2002 | Liu et al. |
| 6,421,663 B1 | 7/2002 | Chen et al. |
| 6,640,221 B1 | 10/2003 | Levine et al. |
| 6,941,298 B2 | 9/2005 | Chow et al. |
| 7,447,686 B2 | 11/2008 | Levine |
| 8,438,152 B2 * | 5/2013 | Ahmed ........................ 707/714 |

(Continued)

*Primary Examiner* — Tony Mahmoudi
*Assistant Examiner* — Muluemebet Gurmu
(74) *Attorney, Agent, or Firm* — Kilpatrick Townsend & Stockton LLP

(57) ABSTRACT

Systems and methods are provided for performing a database query. After receiving an identification of data item components and associations between the data item components, wherein the data item components include a measure and a category, a query generation system creates and executes a database query that comprises one or more Uqueries, wherein each Uquery comprises a Mx segment subquery and a U0 segment subquery. The Mx segment subquery is associated with a table that contains the measure, a table that contains columns for a calculated measure, or a correlated table, and the U0 segment subquery is associated with a table that contains the category, a table that contains columns for a calculated category, a dependent measure table, or a dependent filter table. The query generation system can generate a virtual results table by aggregating Uquery results from one Uquery with Uquery results from another Uquery.

35 Claims, 23 Drawing Sheets

(56) References Cited

U.S. PATENT DOCUMENTS

| | | | |
|---|---|---|---|
| 2005/0240469 A1* | 10/2005 | Rose et al. | 705/10 |
| 2008/0052302 A1* | 2/2008 | Dolley et al. | 707/100 |
| 2008/0215534 A1* | 9/2008 | Beavin et al. | 707/2 |
| 2008/0294996 A1* | 11/2008 | Hunt et al. | 715/739 |
| 2009/0012949 A1* | 1/2009 | Thompson et al. | 707/4 |
| 2009/0077001 A1* | 3/2009 | Macready et al. | 706/57 |

* cited by examiner

SYSTEM, METHOD, AND DATA STRUCTURE FOR AUTOMATICALLY GENERATING DATABASE QUERIES WHICH ARE DATA MODEL INDEPENDENT AND CARDINALITY INDEPENDENT

FIELD

The technology described in this patent document relates generally to computer-implemented database systems.

BACKGROUND

Computer implemented database systems may include a query engine for generating queries to obtain data stored in data tables. Often the kinds of questions that can be asked regarding the data is limited due to factors such as cardinality between specific tables and the types of tables utilized in the data model. If the types of questions asked are not limited then the results provided from a query could be wrong or even unattainable. Some systems utilize metadata, which describes the data, when generating queries. This often results in the use of complex metadata when generating certain queries, which can be cumbersome and even limit the flexibility regarding the various questions that can be asked regarding the data.

SUMMARY

In accordance with the teachings described herein, systems and methods are provided for automatically generating a query in a database system. In one example, a query generation system receives an identification of data item components and associations between the data item components, wherein the data item components include a measure and a category, and wherein the identified association indicates that the measure is independent of another data item component, indicates that the measure is dependent on another data item component, or indicates that two or more data item components are correlated. The query generation system creates and executes a database query for retrieving data item components, wherein the database query includes a first Uquery, wherein the first Uquery includes a Mx segment subquery and a U0 segment subquery, wherein the Mx segment subquery is associated with a table that contains the measure, a table that contains columns for a calculated measure, or a correlated table, and wherein the U0 segment subquery is associated with a table that contains the category, a table that contains columns for a calculated category, a dependent measure table, or a dependent filter table. In another example, the query generation system generates a virtual results table by aggregating the Uquery results from one Uquery with Uquery results from another Uquery and reports the virtual results table.

Depicted in FIGS. 15A-15D are example data mart information maps that identify data tables that may be included in the Mx segment and U0 segment subqueries.

Figure 16A:
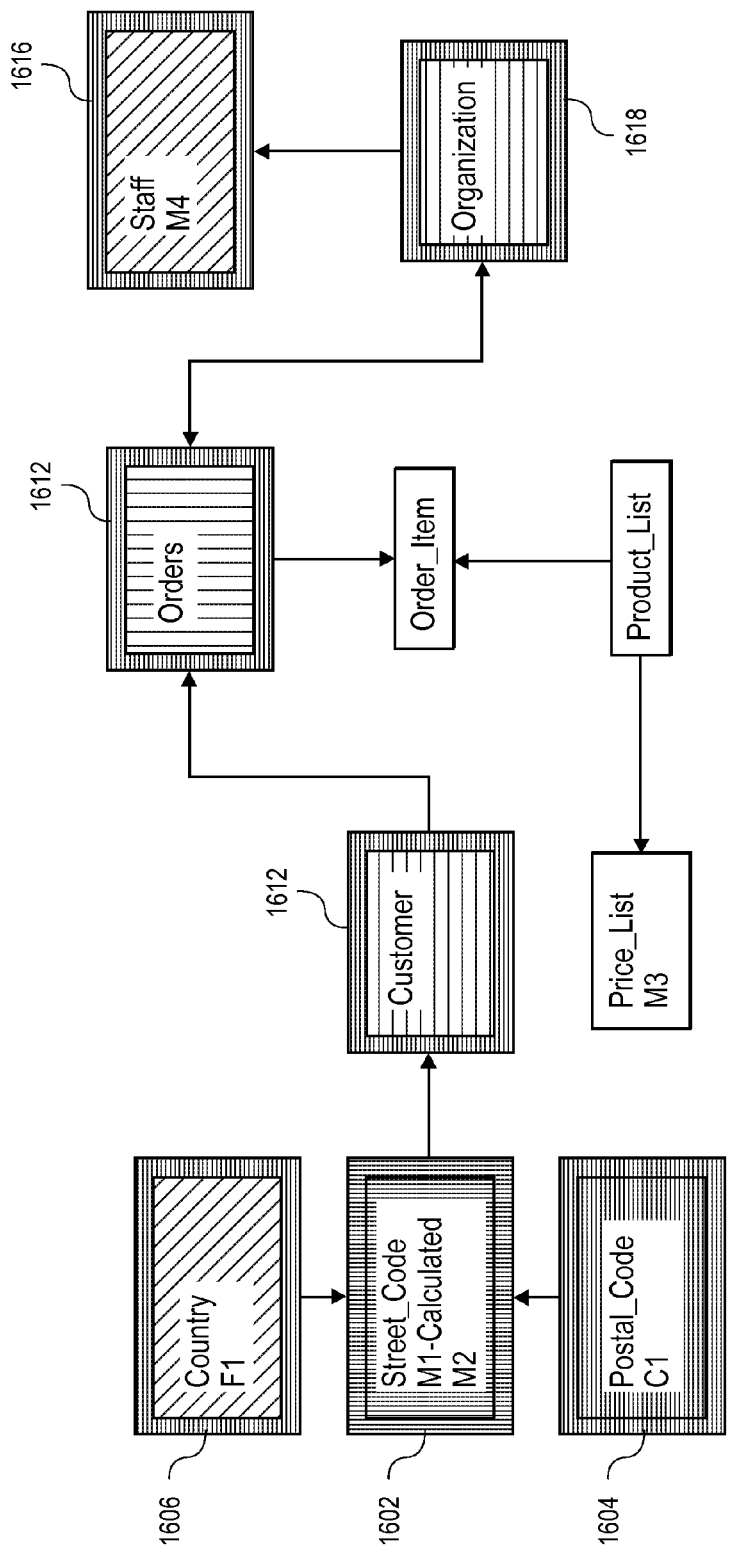
Figure 16B:
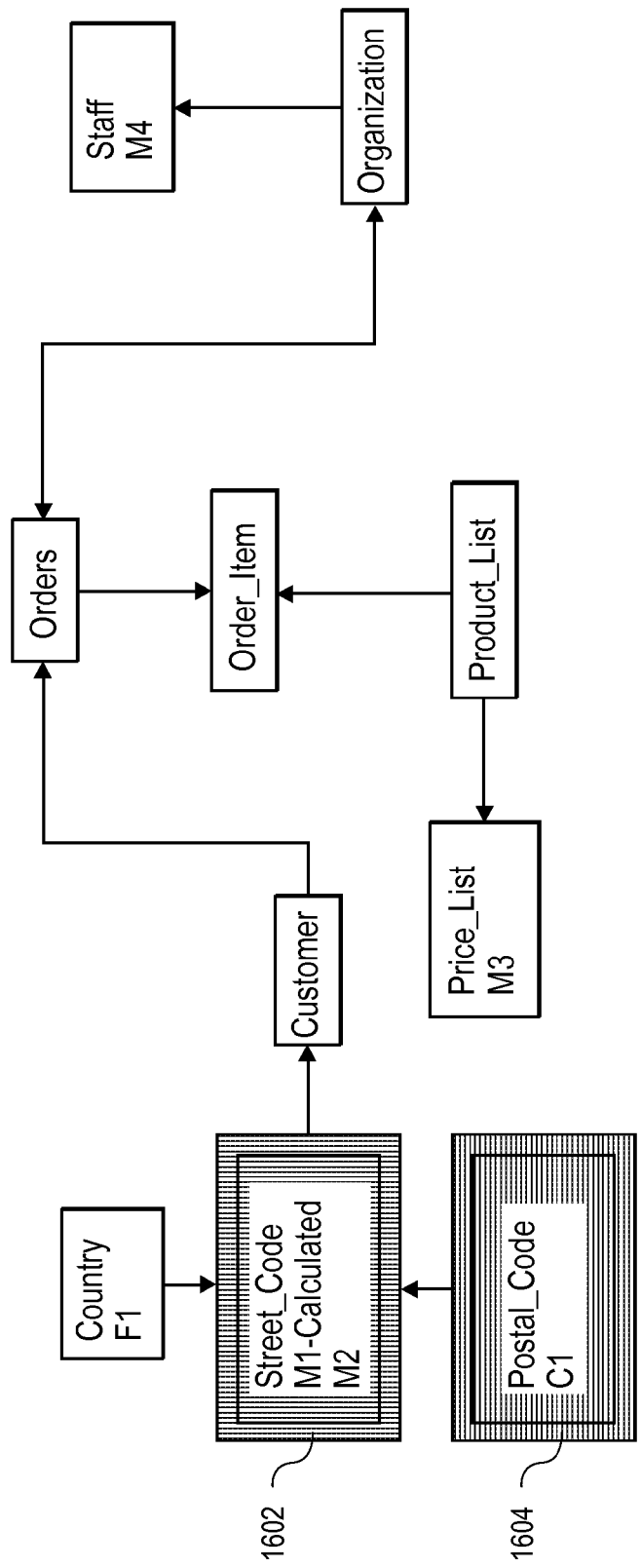
Figure 16C:
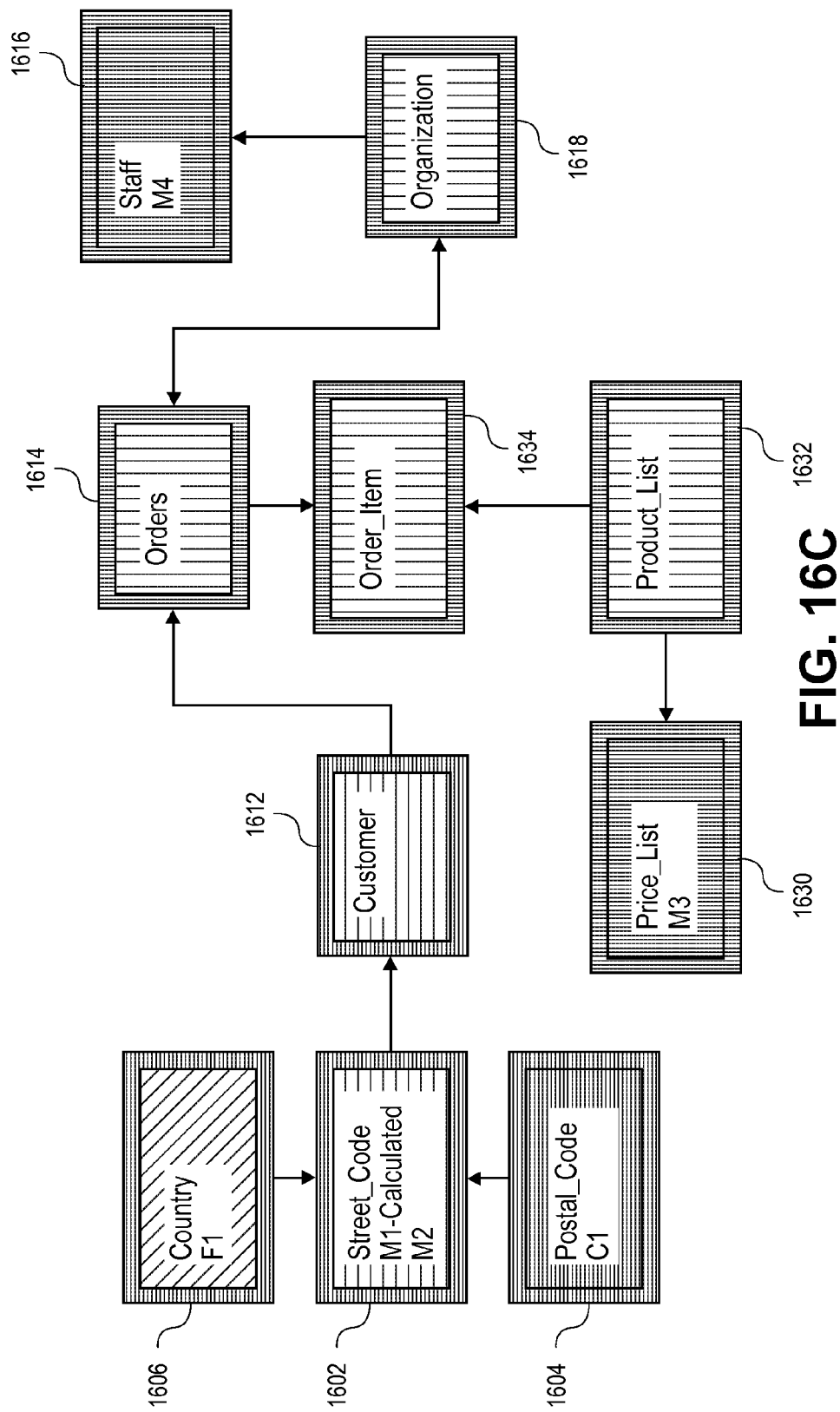

Depicted in FIGS. 16A-16C are additional example data mart information maps that identify data tables that may be included in the Mx segment and U0 segment subqueries.

Figure 17A:
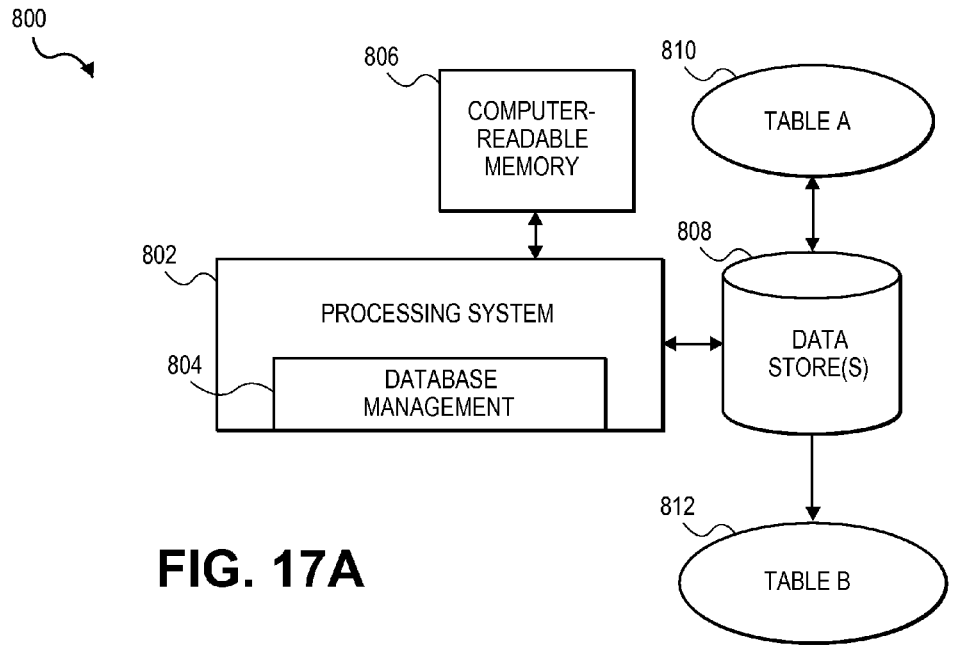
Figure 17B:
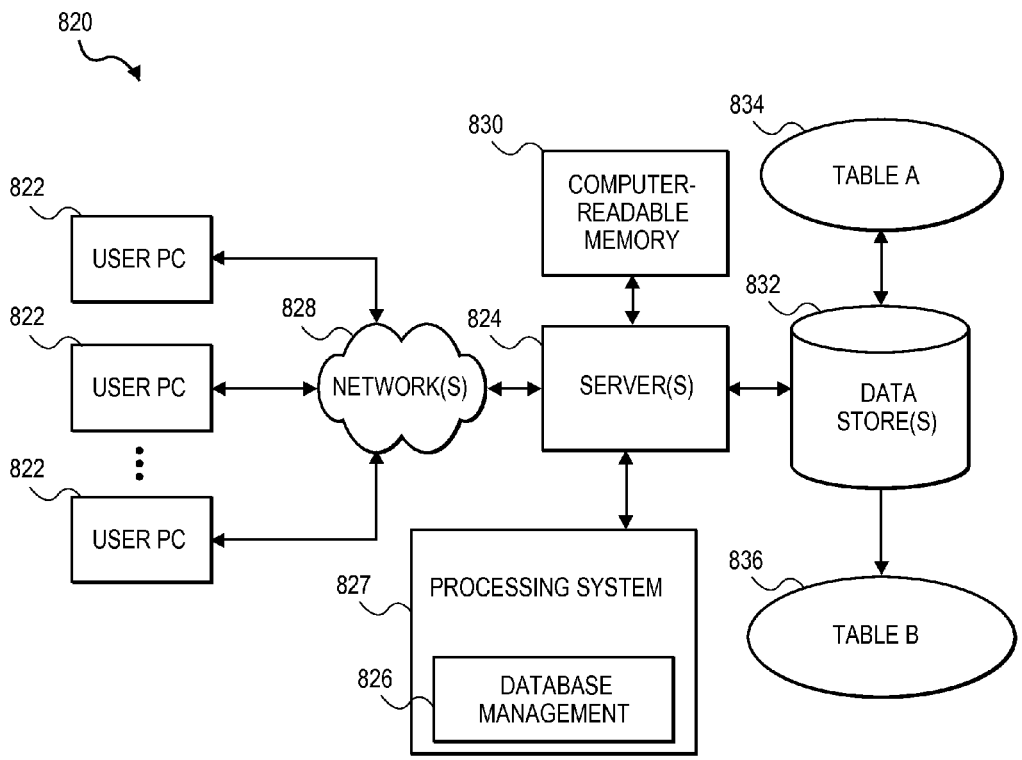
Figure 18:
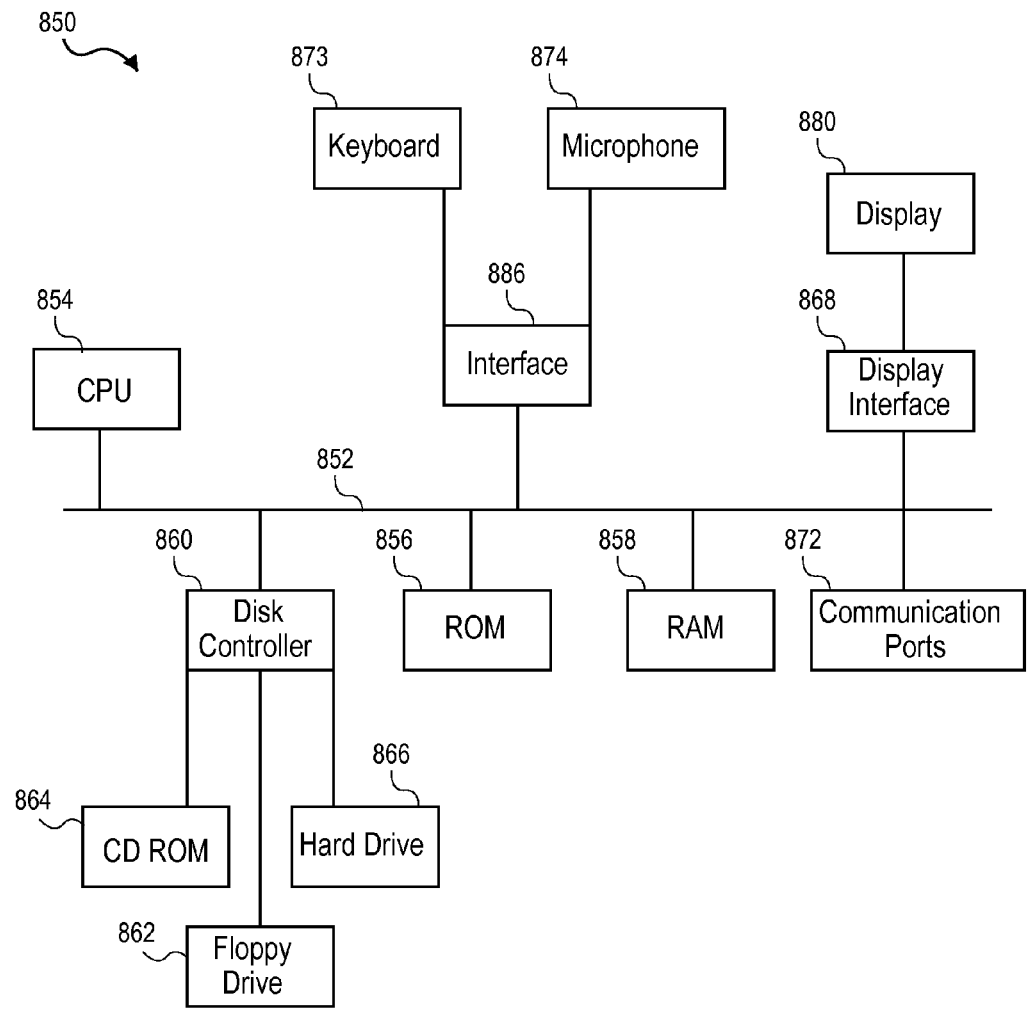

FIGS. 17A, 17B, and 18 depict examples of systems that may be used to perform a query in a database system.

DETAILED DESCRIPTION

Figure 1:
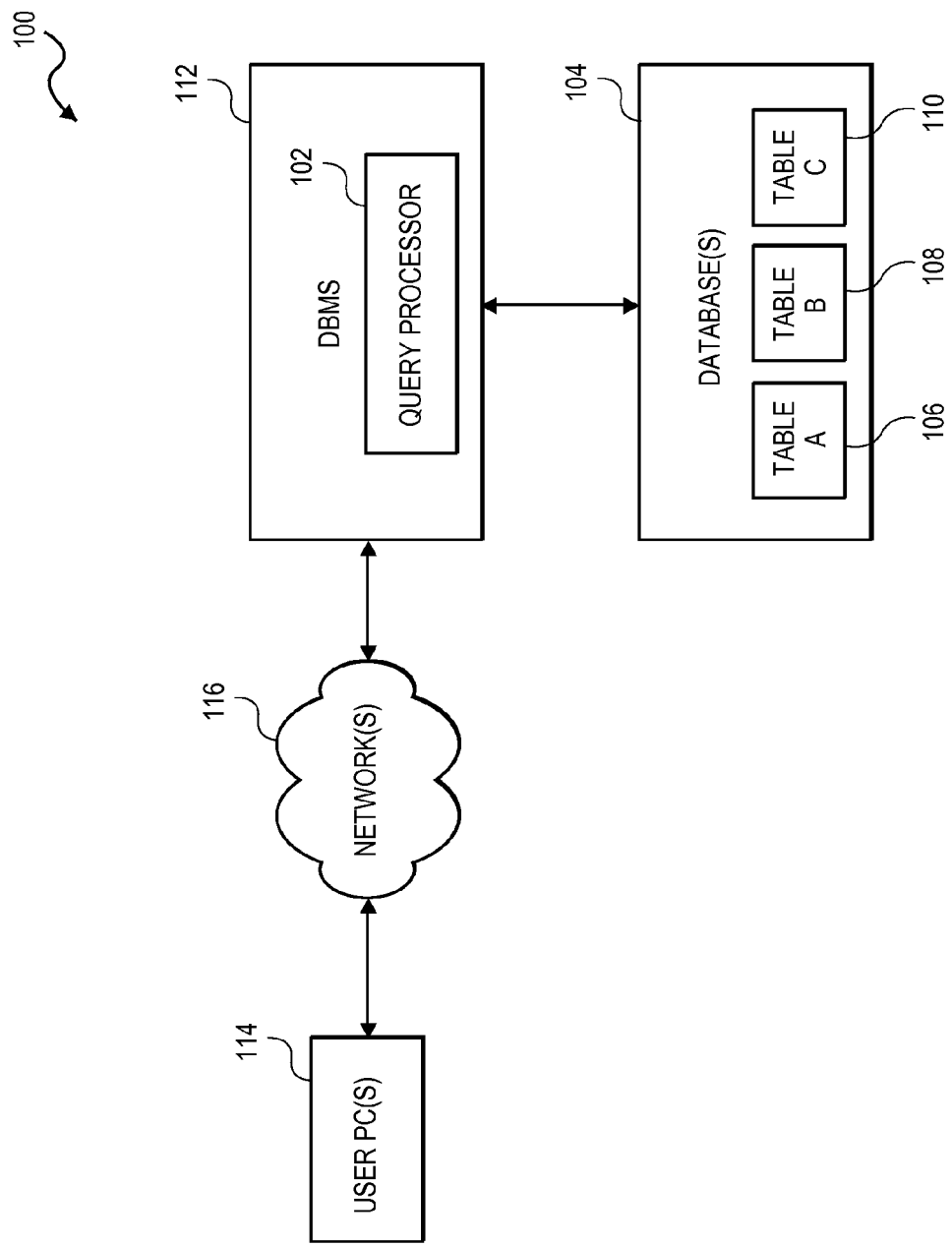
FIG. 1 is a block diagram of an example system for automatically generating database queries in a database system.

Depicted in FIG. 1 is a block diagram of an example system 100 for automatically generating database queries in a database system. The example query generation architecture includes a query processor 102 for accessing one or more databases 104 that store data tables 106, 108, 110. The query processor 102 and the databases 104 may, for example, be included in a federated database system. For instance, the query processor 102 may be an SQL processor executing within a database management system 112.

In operation, users may access the database management system 112, for example, via user PC(s) 114 over one or more network(s) 116. The query processor 102 utilizes data selection parameters supplied by a user to generate queries that retrieve data results of interest to the user. The query processor 102 may then provide the data results to the user PC 114.

Figure 2:
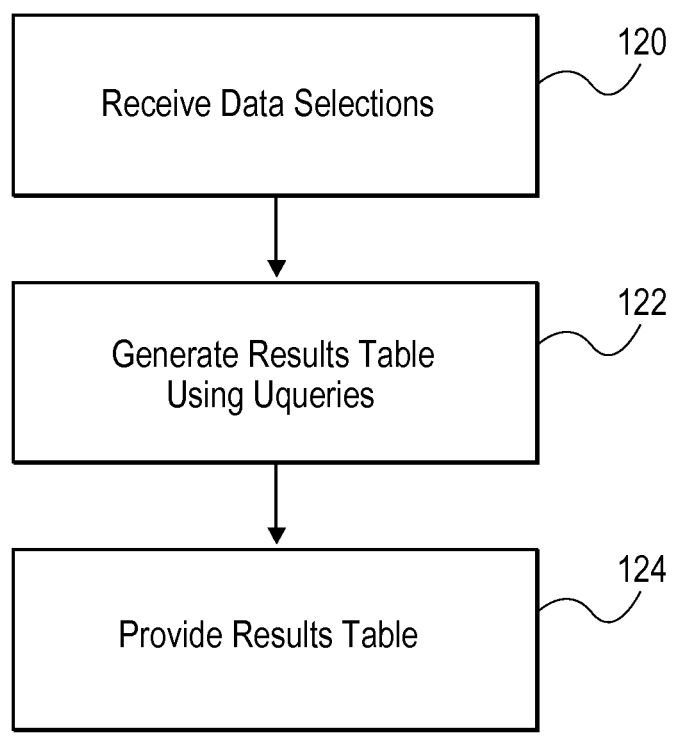
FIG. 2 is a flow diagram that depicts an example process that a query processor may implement to provide data results to a user.

FIG. 2 depicts an example process that the query processor 102 may implement to provide data results to a user. At step 120 data selections are received from a user. At step 122, the data results are retrieved by generating and executing one or more queries. Finally, at step 124, the data results are provided to the user.

Figure 3:
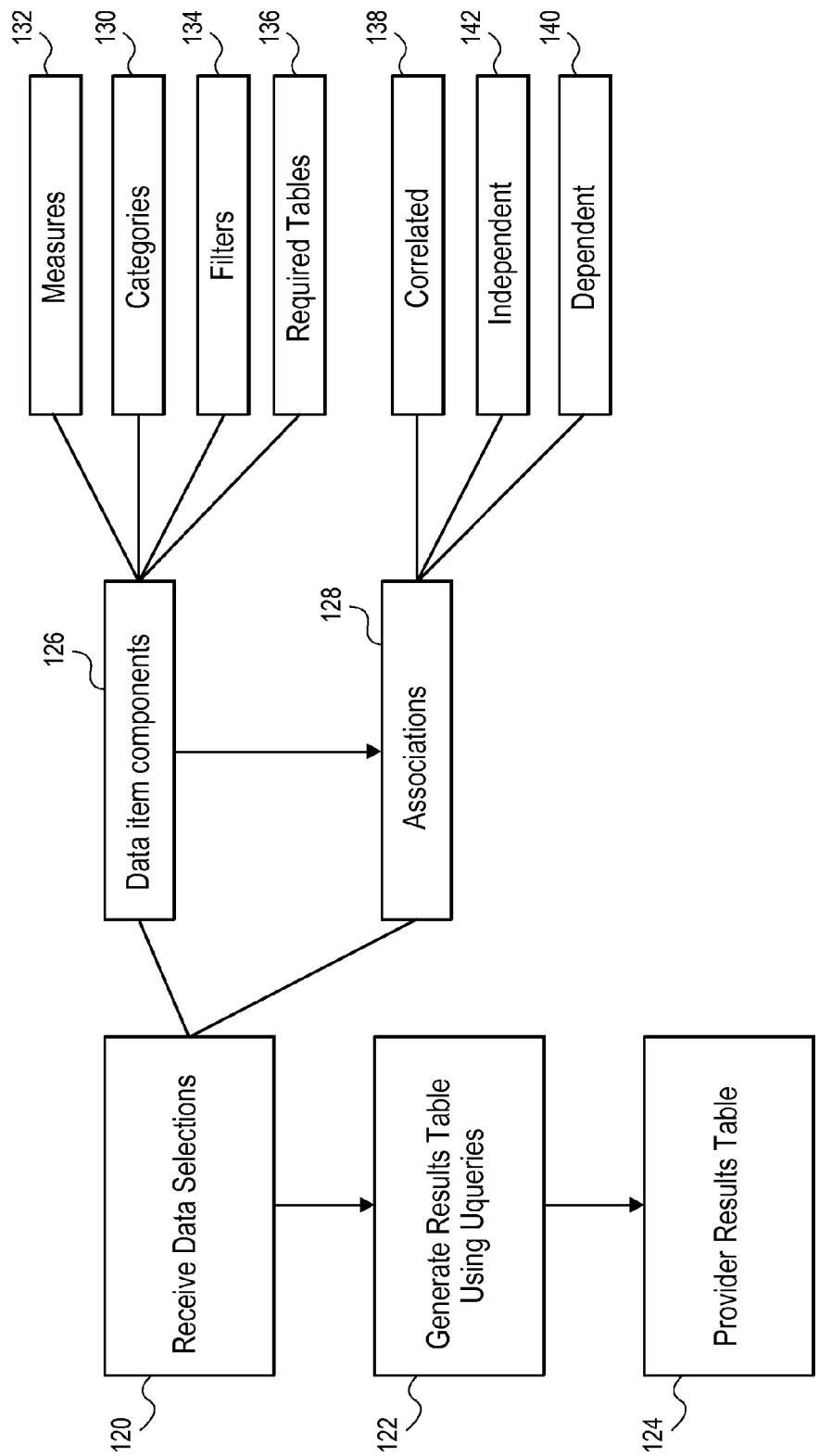
FIG. 3 is a flow diagram that illustrates two types of data selections that may be received by a query processor: data item components and associations.

FIG. 3 illustrates two types of data selections that are received by the example query generation architecture: data item components 126 and associations 128. The data item components 126 provide an identification of categories 130, measures 132, filters 134, and required tables 136 utilized in the generation of data results. The associations 128 identify relationships between the specified data item components 126. Required tables are tables that are implicitly included in any data selection run against a data mart.

In the example system, three distinct levels of association between the data item components 126 are specified. These three levels of association, correlated 138, dependent 140, and independent 142 (C/D/I), are relative to Measures 132. Measures 132 can be correlated to, dependent on, or independent of other measures 132, filters 134, and required tables 136. Each measure can have a different level of association to these other components for a given data selection, thus allowing the user to ask many different questions of the same group of components. Also, measures 132 and filters 134 can be independent of or dependent on categories 130.

With regard to a measure that is independent of another measure, (a) each measure is calculated separately; (b) the existence of other Measures for a given category group IS NOT required in order to include values of the measure being calculated for that category group; and (c) the measure will not be inflated by many cardinality of other tables.

With regard to a measure that is dependent on another measure, (a) each measure is calculated separately; (b) the existence of other dependent measures for a given category group IS required in order to include values of the measure being calculated for that category group; and (c) the measure will not be inflated by many cardinality of other tables.

With regard to a measure that is correlated to another measure, (a) both (all) measures are calculated together; (b) the existence of other correlated measures for a given category group IS required in order to include values of the measure being calculated for that category group; and (c) the measure will (can) be inflated by many cardinality of other tables.

Thus, two measures can be related to each other in these three different ways, and the calculations for each of these cases could yield potentially different results depending upon the physical data model. Also, regardless of the physical data model and whether the results happen to be the same or different, these three different relationships have three specific meanings which translate to three distinct, non-ambiguous, questions being asked.

When there are more than two measures, the combination of possible relationships between the various measures results in many subtly different questions that can be asked. Also, since Measures can have C/D/I associations to filters and required tables, as well as with other measures and categories, many different, very specific questions, may be asked of the same set of components.

Figure 4:
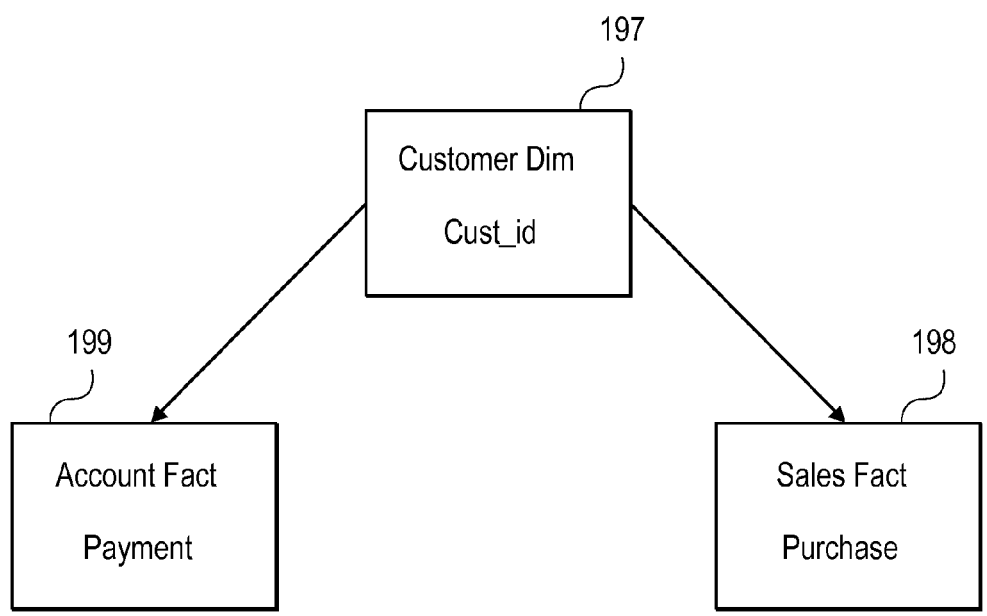
FIG. 4 is a block diagram of an example database having two fact tables (Sales and Account) with a common dimension table (Customer).

FIG. 4 depicts a block diagram of an example database having two fact tables (Sales and Account) with a common dimension table (Customer). The data selection in this example consists of a measure from each fact table and a category from the dimension table wherein the measure from the account fact table is the calculated measure sum_payment, the measure from the sales fact table is the calculated measure sum_purchase, and the category from the dimension table is cust_id. Listed below are tables illustrating example values for the two fact tables.

| SALES FACT | |
|---|---|
| cust_id | sum_purchase |
| 1 | 3 |
| 2 | 2 |

| SALES FACT | |
|---|---|
| cust_id | sum_purchase |
| 3 | 11 |
| 4 | 1 |
| 5 | 4 |
| 7 | 2 |
| 8 | 6 |

| ACCOUNT FACT | |
|---|---|
| cust_id | sum_payment |
| 1 | 23 |
| 3 | 56 |
| 4 | 15 |
| 5 | 10 |
| 6 | 17 |
| 7 | 23 |

The example results listed in the following three results tables illustrate different results that can be obtained from a query based on the C/D/I association between measures. In the Correlated case, as depicted in the example table, when the two measures are correlated, the measures can be inflated, while not so in the dependent and independent cases. In the Independent case, as depicted in the example table, when the two measures are independent of each other, the example results table includes results for customers who do not have both purchases and payments, while the correlated and dependent cases exclude results for those customers. In the dependent case, as depicted in the example results table, when the two measures are dependent on each other, the multiplying effect of the many cardinality between the measure tables is eliminated, while maintaining the filtering effect that the measure tables have on each other.

| Correlated Measures | | |
|---|---|---|
| cust_id | sum_purchase | sum_payment |
| 1 | 6 | 46 |
| 3 | 44 | 224 |
| 4 | 2 | 30 |
| 5 | 4 | 20 |
| 7 | 4 | 46 |

| Dependent Measures | | |
|---|---|---|
| cust_id | sum_purchase | sum_payment |
| 1 | 3 | 23 |
| 3 | 11 | 56 |
| 4 | 1 | 15 |
| 5 | 4 | 10 |
| 7 | 2 | 23 |

| Independent Measures | | |
|---|---|---|
| cust_id | sum_purchase | sum_payment |
| 1 | 3 | 23 |
| 2 | 2 | . |
| 3 | 11 | 56 |
| 4 | 1 | 15 |
| 5 | 4 | 10 |
| 6 | . | 17 |
| 7 | 2 | 23 |
| 8 | 6 | . |

Each of these result sets can be the correct answer to a slightly different question asked about the same data. Each answer is valid and the ability to ask each question, as well as know which question is being asked, is provided for by the query generation architecture described herein. These questions are self-describing and independent of the physical data.

The query generation architecture described herein is data model and cardinality independent. For a relational model, such as a data mart for instance, there can be many different levels of granularity. The many cardinality transition between tables can be considered a transition to a different hierarchical level. Within a data mart, there may be many of these transitions. The query generation architecture described herein can support a single result set that has categories and/or measures at different levels. This architecture can return different levels of granularity within a single result set in a predictable, deterministic way.

The query generation architecture described herein may also provide the ability to get an aggregate number of NULL values for a given measure. The query generation architecture described herein may also provide the ability to segregate the aggregate measures for a category value of NULL from non-existing categories (measures that don't correspond to any category value), on a per measure basis.

The query generation architecture described herein operates with different types of data models, basic metadata which describes the tables, columns and the join keys between the tables, and an arbitrary combination of categories, measures, filters and required tables, allowing for many different combinations of C/D/I association between these items, and automatically generates the correct query for each of these possible cases.

Figure 5A:
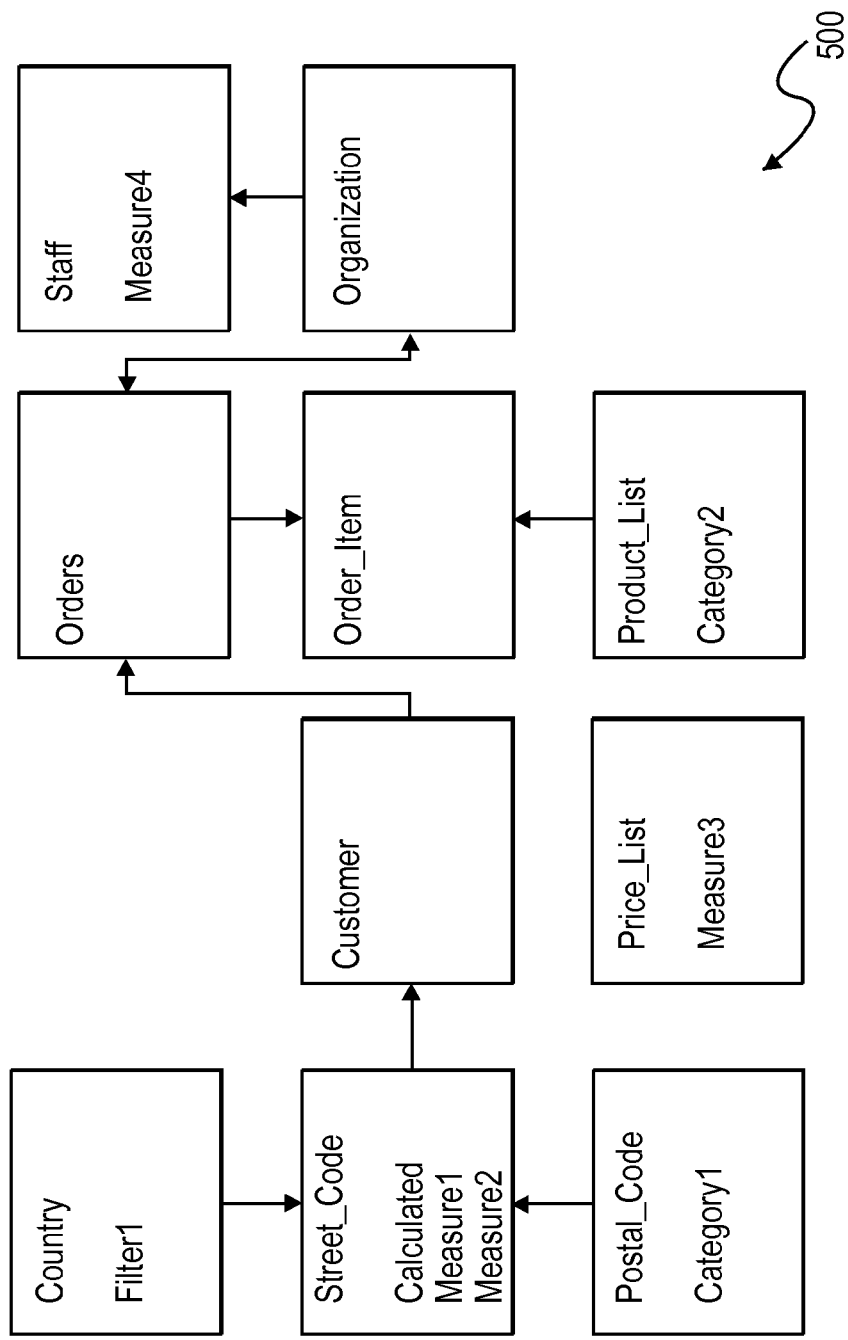
FIGS. 5A and 5B are block diagrams that depict an example data mart that contains database tables that may be accessed to generate data results.
Figure 5B:
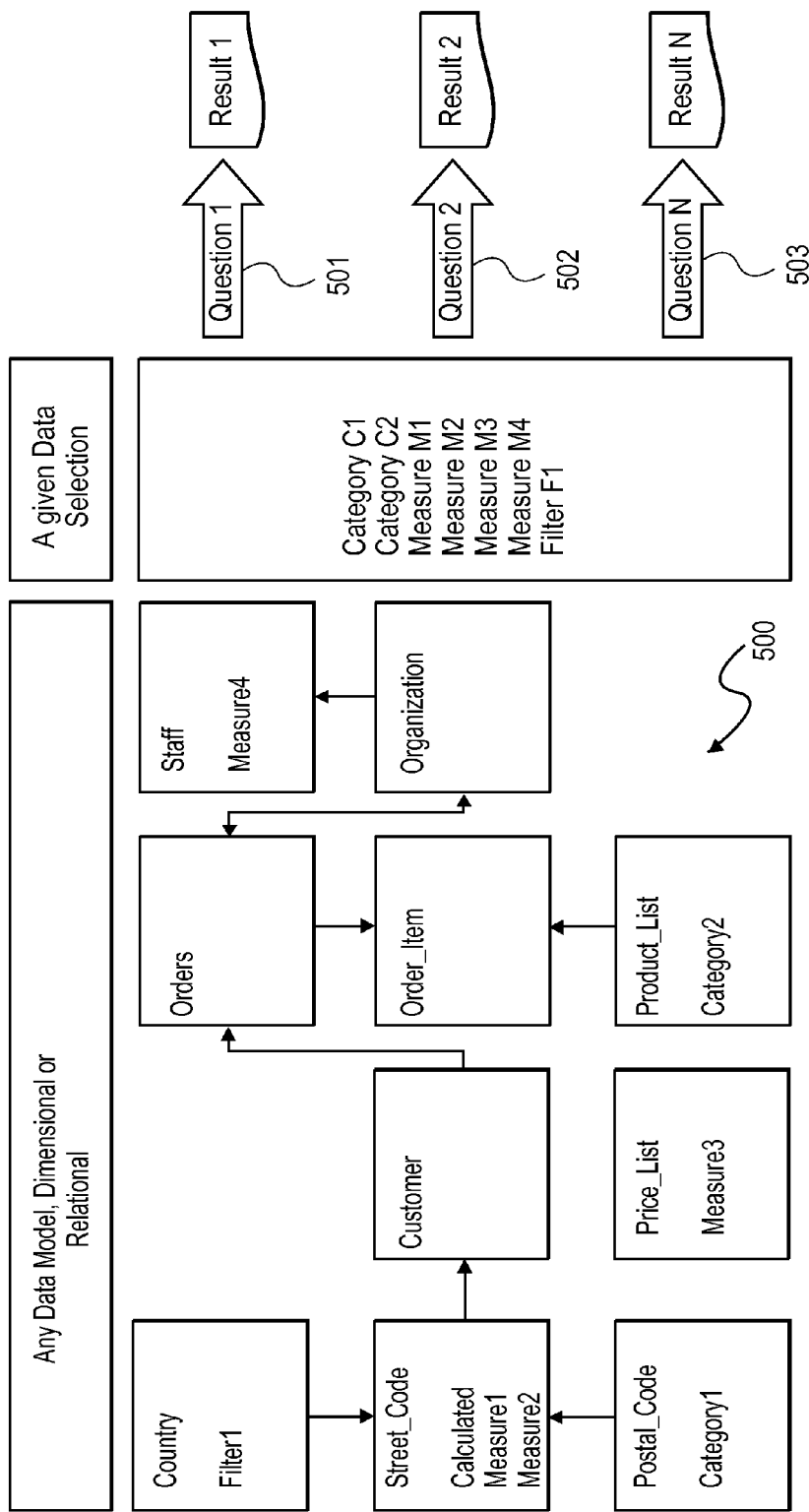

Depicted in FIG. 5A is an example data mart 500 that contains database tables that may be accessed to generate data results. The example data mart has two categories (category C1 and category C2), four measures (measure M1, measure M2, measure M3 and measure M4), and one filter (filter F1) contained within the tables in the data mart. The lines between tables show their join cardinalities—a straight end is a one cardinality, while an arrow end is a many cardinality. As illustrated in FIG. 5B, the query generation architecture can ask many different questions such as questions depicted at 501, 502, 503) from this one set of data items, generating the appropriate query which gets the right answer for each different question.

The query generation architecture can operate with different types of data models with the knowledge of the C/D/I association between the data item components. The query generation architecture is also cardinality independent—for any given question that can be asked, the correct SQL query can be generated to accurately calculate the answer regardless of the data model or the cardinality between any of the tables—without the need for extra manipulation of the modeling metadata to try to cause or 'trick' the software into generating the correct query to get the correct results.

The query generation architecture does not use metadata to identify the data model, tables are not tagged as fact or dimension, and a given map is not identified as dimensional (e.g., a Star Schema) or relational. The query generation architecture uses tables that are associated to each other through join relationships.

Figure 6:
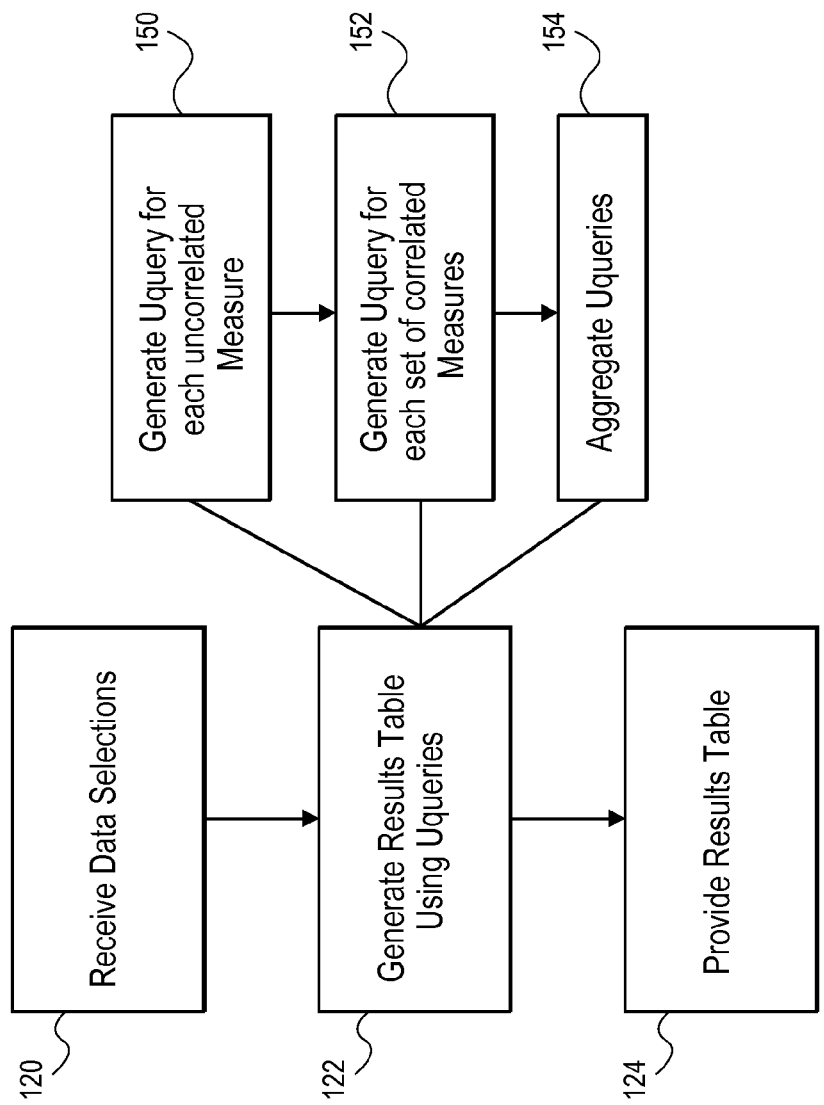
FIG. 6 is a flow diagram that depicts an example process that a query generation architecture executes to generate data results.

FIG. 6 depicts an example process that the query generation architecture executes to generate data results. After receiving data selections (step 120), the query generation architecture generates and executes one or more of a special type of query, referred herein as Uquery, and aggregates the results of the Uqueries to generate a results table. In particular, the query generation architecture generates and executes a Uquery for each uncorrelated measure (step 150), generates and executes a Uquery for each set of correlated measures (step 152), and aggregate the results of the Uqueries as a results table (step 154). The query generation architecture generates a results table using the Uqueries (step 122), and provides the results table to a user (step 124).

Figure 7A:
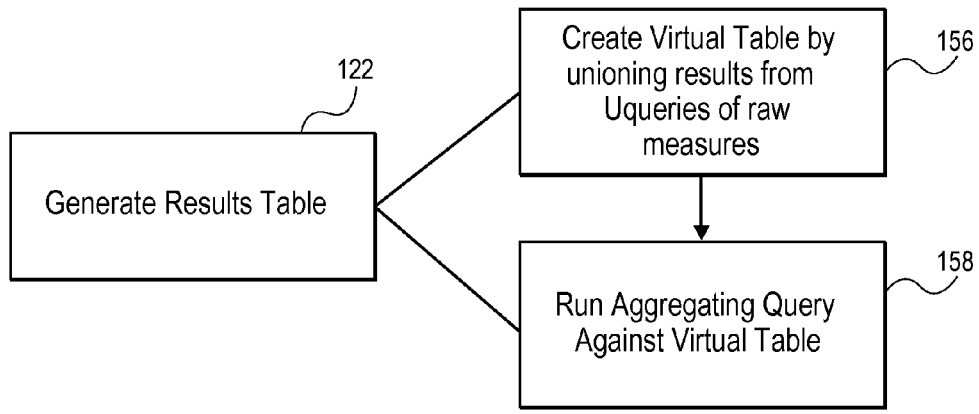
FIGS. 7A and 7B are flow diagrams that illustrate that a Uquery can be executed to produce raw (or detail level) measure values or aggregated measure values.
Figure 7B:
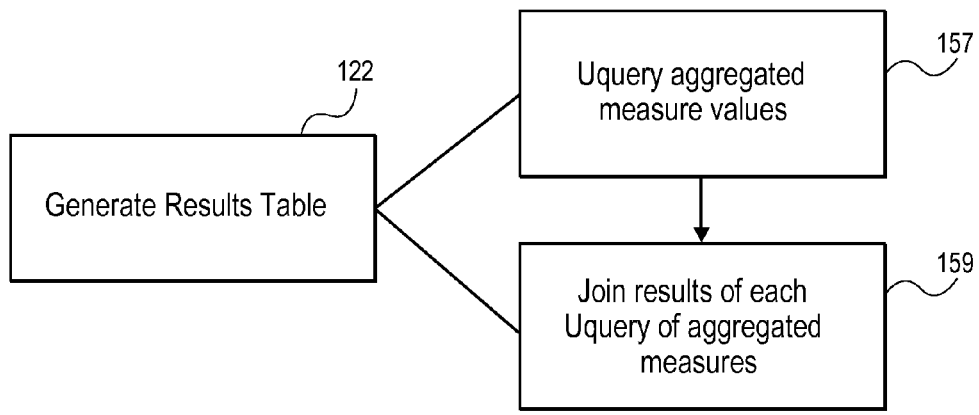

FIGS. 7A and 7B depict that the Uqueries can be executed to produce raw measure values or aggregated measure values. In the case of Uqueries executing to produce raw measures, to generate the results table (step 122 in FIG. 7A), a virtual table can be created by unioning results from Uqueries' raw measures (step 156) and an aggregating query can be run against the virtual table (step 158). Alternatively, as shown in FIG. 7B, Uqueries can be executed producing aggregated measure values (step 157) and the results of the Uqueries' aggregated measures can be joined (step 159) to generate the results table (step 122 in FIG. 7B).

Figure 8:
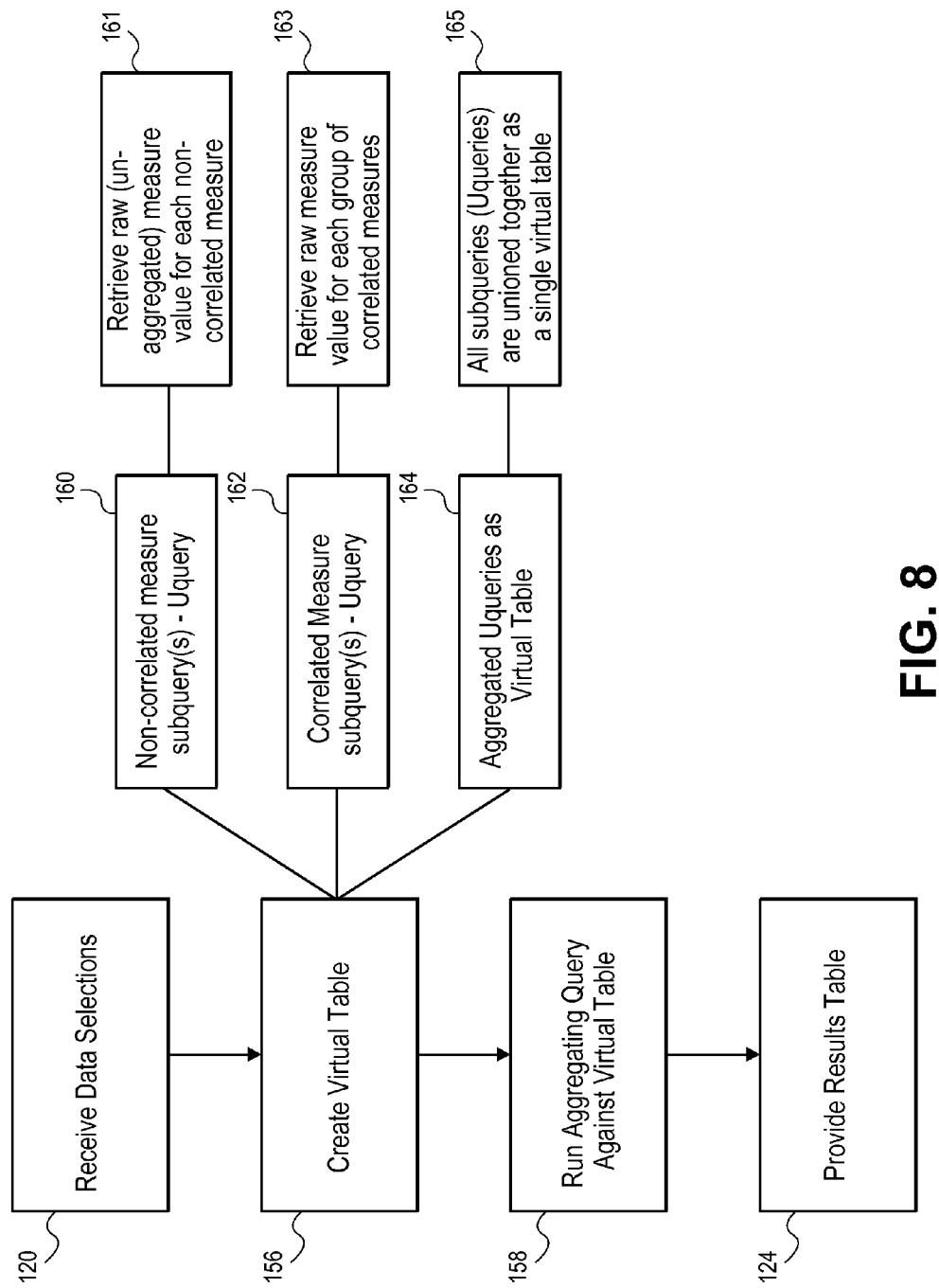
FIG. 8 is a flow diagram that depicts an example process that a query generation architecture may execute to generate data results in the case where a Uquery is executed to produce raw measure values.

FIG. 8 depicts an example process that the query generation architecture may execute to generate data results in the case where Uqueries are executed to produce raw measure values. Non-correlated measure subquery(s) are generated and executed (step 160). Correlated Measure subquery(s) are generated and executed (step 162). The results from the non-correlated measure subquery(s) and correlated measure subquery(s) are then aggregated as a virtual table (step 164). In particular, the non-correlated measure subquery(s) involves gathering raw (un-aggregated) measure values of each non-correlated measure (step 161). The correlated measure subquery(s) involves gathering raw (un-aggregated) measure values for each group of correlated measures (step 163). The aggregate Uqueries as virtual table step is performed by unioning together all the Uquery results as a single virtual table (step 165).

Figure 9:
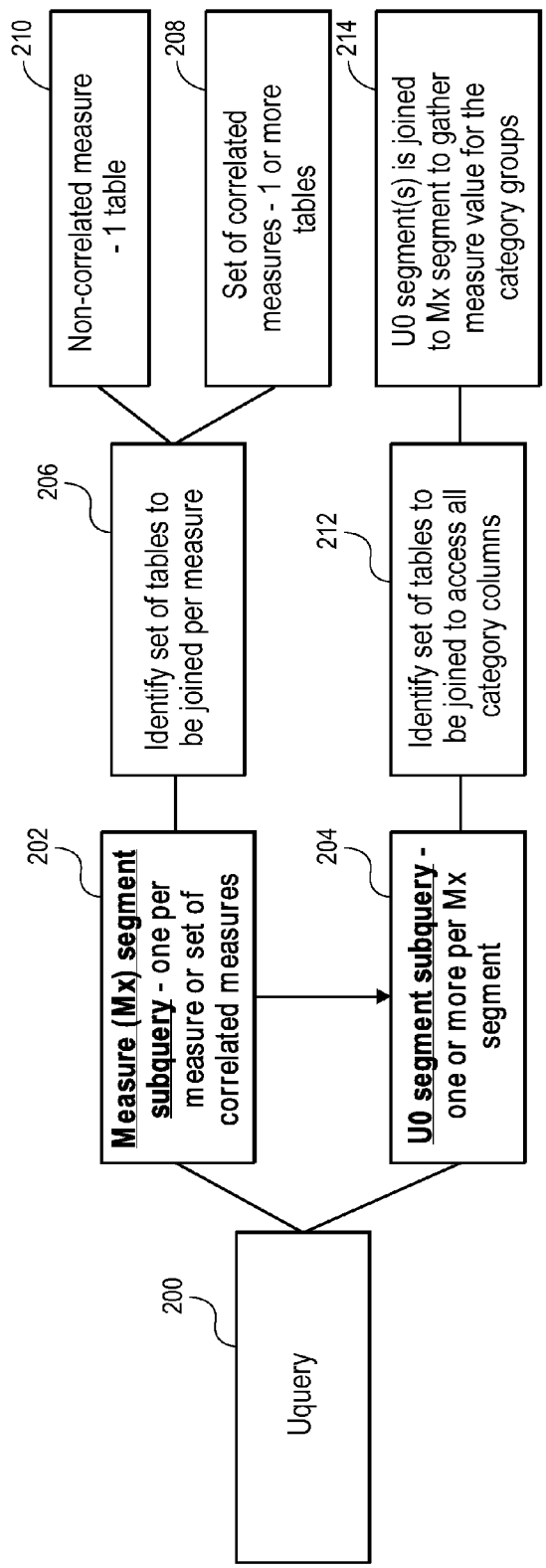
FIG. 9 is a flow diagram that depicts a Uquery that logically comprises two subqueries: an Mx segment subquery and a U0 subquery.

As depicted in FIG. 9, each Uquery (200) logically comprises two subqueries: one is primarily related to measures and is referred to herein as a measure (or Mx) segment subquery (202), and the other is primarily related to categories and is referred to herein as an U0 subquery (204). Each Uquery has two goals: gather the appropriate set of measure values and associate each to the correct category group. In practice either of the Mx or U0 subqueries may be represented by a single table. Alternatively, the U0 subquery may be segmented into multiple subqueries, i.e., multiple U0 segments.

Listed below is an example query showing an outer aggregating query against the single virtual table (U1) which is generated from two Uqueries, one for each of the two non-correlated measures (M1 and M2) and wherein each Uquery has U0 and Mx segments that are each a single table:

```
Select U1.Col1         as C1,
       SUM(U1.Col2) as M1,
       AVG(U1.Col3) as M2
From
(
/* Uquery 1 */
    Select U0.Col1, Mx.Col2, . as Col3
    From      U0
    Inner join Mx
           on U0.keys = Mx.keys
Union All
/* Uquery 2 */
    Select U0.Col1, . as Col2, Mx.Col3
    From      U0
    Inner join Mx
           on U0.keys = Mx.keys
) U1
Group by C1
```

The columns that are selected for each Uquery in the example query are: (i) each of the categories and (ii) each of the measures, where all measures other than the one(s) being gathered for that Uquery are selected as NULL. This allows all measures to be: (a) associated to the correct category group, (b) gathered separately, (c) Union'ed together, and (d) aggregated correctly by the outer aggregating query.

Referring again to FIG. 9, each Uquery contains a single Mx segment subquery and the Mx segment subquery is related to either one measure or to a single set of correlated measures (202). The Mx segment subquery identifies the tables that must be joined to access the measure column(s) (206). For correlated measures there are one or more tables from which the columns for the Measures segment subquery are derived (208). For non-correlated measures, there is one measure table from which the column is derived, which is a Mx Segment consisting of one table (210).

Each Uquery may contain one or more U0 segment subqueries (204). The U0 segments identify the set of tables that must be joined together to access all of the columns in the set of categories (there can be more than one category) (212). The U0 segment(s) is identified independent of measures. The U0 segment(s) is joined to the Mx segment in order to gather the raw measure values for the category groups (214).

Figure 10:
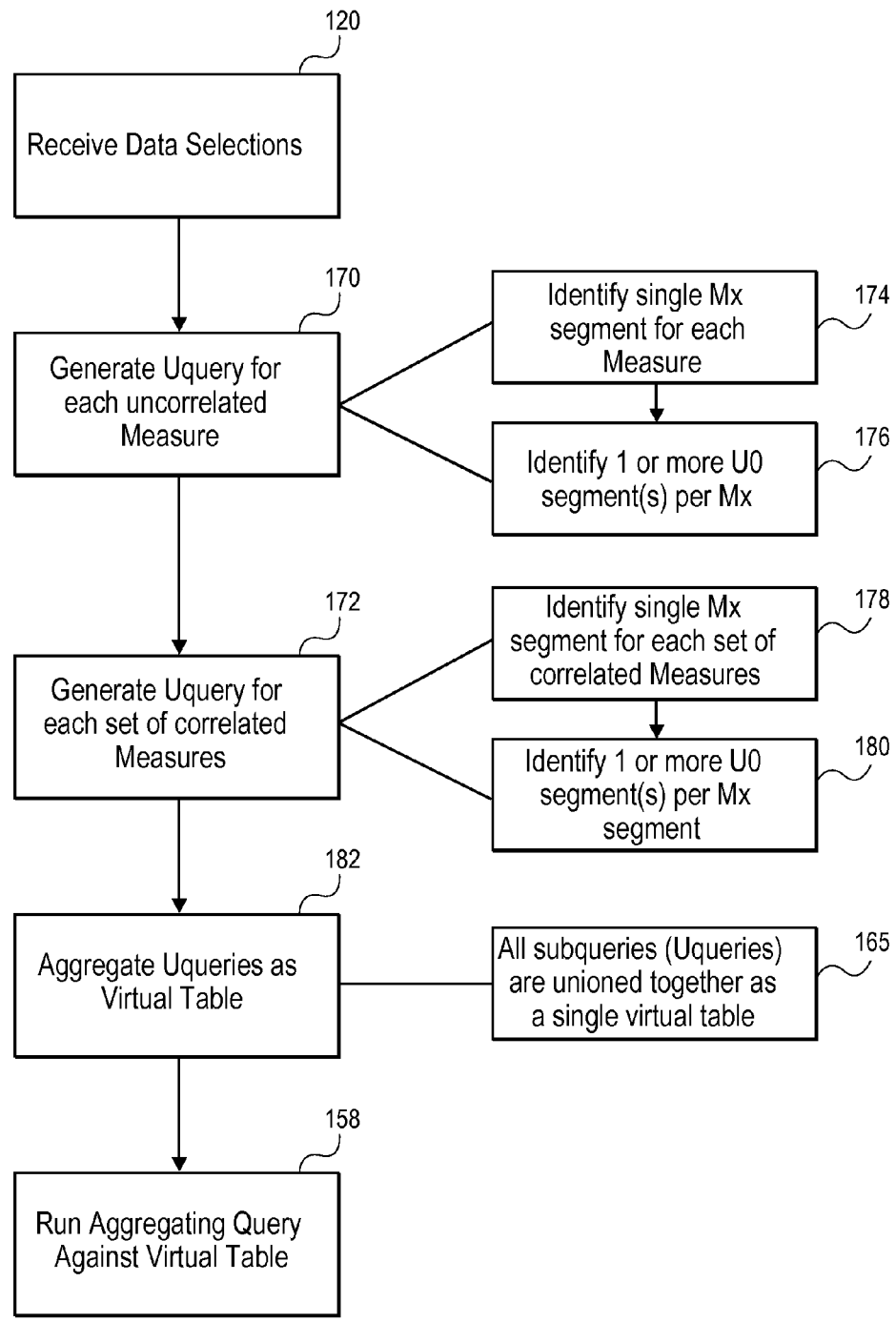
FIG. 10 is a flow diagram that depicts another example process that a query generation architecture may execute to generate data results in the case where Uqueries are executed to produce raw measure values.

FIG. 10 depicts another example process that the query generation architecture may execute to generate data results in the case where Uqueries are executed to produce raw measure values. After receiving data selections (step 120), the architecture generates a Uquery for each uncorrelated measure (step 170) and each set of correlated measures (step 172). In this example process, generating a Uquery for each uncorrelated measure involves identifying a single Mx segment for each measure (step 174) followed by identifying 1 or more U0 segment(s) per Mx segment (step 176). Similarly, generating a Uquery for each set of correlated measures involves identifying a single Mx segment for each set of correlated measures (step 178) followed by identifying 1 or more U0 segment(s) per Mx segment (step 180). The Uqueries are aggregated as a virtual table (step 182). In this case, in which Uqueries are executed to produce raw measure values, aggregating the Uqueries is accomplished by unioning together the results from all Uqueries into a single virtual table (step 165). After the Uqueries have been aggregated, an aggregating query can be run against the virtual table (step 158).

Figure 11:
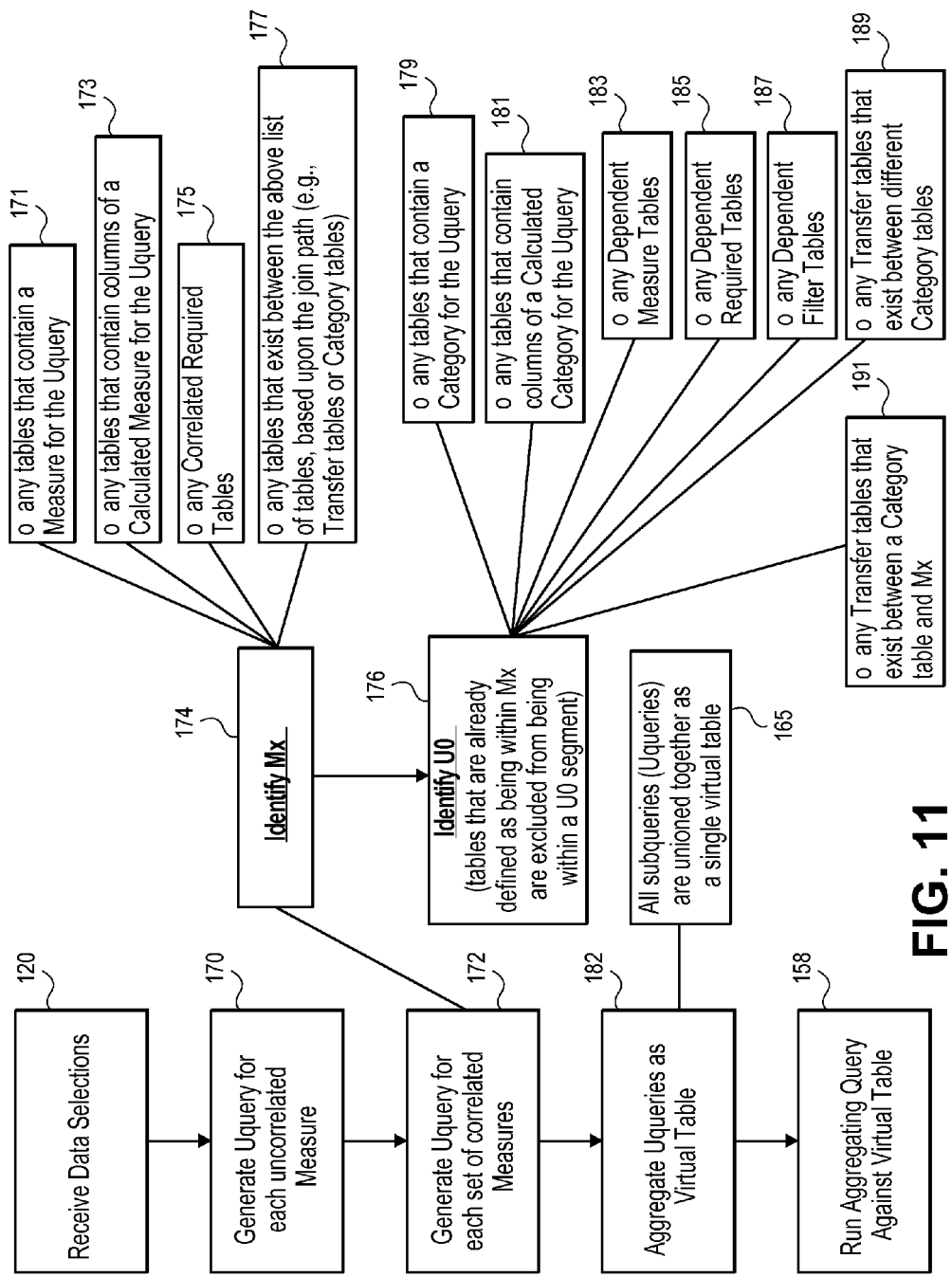
FIG. 11 is a flow diagram that provides example rules for identifying tables to be included in the Mx segment subquery and the U0 segment subquery(s) for a Uquery for an uncorrelated measure.

FIG. 11 illustrates example rules for identifying tables to be included in the Mx segment subquery (step 174) and the U0 segment subqueries (step 176) for a Uquery for an uncorrelated measure. In the illustrated example, the Mx segment includes the following joined tables:
- any tables that contain a measure for the Uquery (171);
- any tables that contain columns of a calculated measure for the Uquery (173);
- any correlated required tables (175); and
- any tables that exist between the above list of tables, based upon the join path (177). These can be transfer tables or category tables.

Transfer tables are tables in the join path between the tables selected to be in the segment and from which no data is selected.

The U0 segments are identified after their corresponding Mx segment has been identified. The U0 segments help account for the many cardinality concern. The U0 segments only select the distinct set of categories and join keys that join directly to Mx. Tables that are already defined as being within Mx are excluded from being within a U0 segment. In the illustrated example, the U0 segments includes the following joined tables:
- any tables that contain a category for the Uquery (179)
- any tables that contain columns of a calculated category for the Uquery (181);
- any dependent measure tables (183);
- any dependent required tables (185);
- any dependent Filter tables (187);
- any transfer tables that exist between different category tables (189); and
- any transfer tables that exist between a category table and Mx (191).

A dependent measure table contains dependent measures, which function to filter or restrict certain categories and/or measure values from being included in the result set. A dependent filter table contains columns of data for a filter on which a measure is dependent. By including dependent or transfer tables in a U0 segment, possible concerns with many cardinalities between tables are factored out. This helps allow for cardinality independence.

Figure 12:
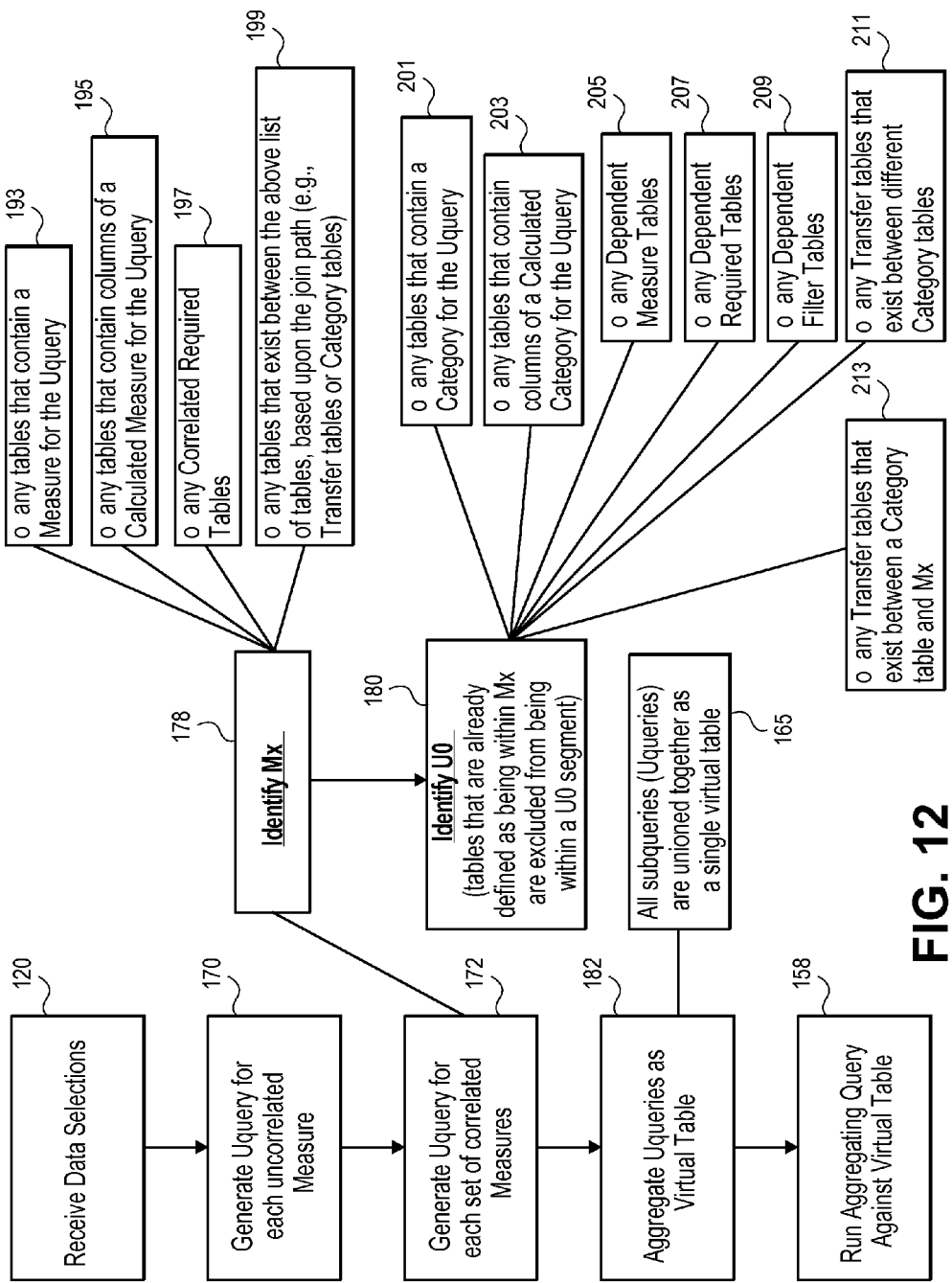
FIG. 12 is a flow diagram that provides example rules for identifying tables to be included in the Mx segment subquery and the U0 segment subquery(s) for a Uquery for a set of correlated measures.

FIG. 12 illustrates example rules for identifying tables to be included in the Mx segment subquery (step 178) and the U0 segment subqueries (step 180) for a Uquery for a set of correlated measures. In the illustrated example, similar to the FIG. 11 example, the Mx segment includes the following joined tables:
- any tables that contain a measure for the Uquery (193);
- any tables that contain columns of a calculated measure for the Uquery (195);
- any correlated required tables (197); and
- any tables that exist between the above list of tables, based upon the join path (199). These can be transfer tables or category tables.

The U0 segments are identified after their corresponding Mx segment has been identified. Tables that are already defined as being within Mx are excluded from being within a U0 segment. In the illustrated example, similar to the FIG. 11 example, the U0 segments includes the following joined tables:
- any tables that contain a category for the Uquery (201)
- any tables that contain columns of a calculated category for the Uquery (203);
- any dependent measure tables (205);
- any dependent required tables (207);
- any dependent filter tables (209);
- any transfer tables that exist between different category tables (211); and
- any transfer tables that exist between a category table and Mx (213)

FIG. 12 also illustrates that rules for identifying tables to be included in the Mx segment subquery and the U0 segment subqueries for a Uquery can be the same for a set of correlated measures and for uncorrelated measures. The rules for identifying tables to be included in the Mx segment subquery and the U0 segment subqueries for a Uquery may also be the same for the case where Uqueries are executed to produce raw measure values and for the case where Uqueries are executed to produce aggregated measure values.

In addition to the rules illustrated in FIGS. 11 and 12, the query generation architecture may apply the following rules:
  Each Uquery selects a column for each category and measure along with any NMISS( ) Measure columns.
  Each Uquery selects Missing (NULL) for any measures that are not being gathered by that Uquery.

There is a special Uquery that can be included, if requested, that selects Missing for all measure and is used to gather a full list of possible category groups. This query uses U0 with no MX and gathers all category groups including those having all measures of Missing/NULL.
  Each non-correlated measures is gathered in Mx of a single Uquery
  Each group of correlated measures are gathered in Mx of a single Uquery
  The set of columns (not aggregated measures) defined in a calculated measure are correlated. They are treated as a set of correlated measures, which can then be dependent on, or correlated to other items; it's the calculated measure itself that is dependent on or correlated to the other items.
  The columns selected from U0 and Mx for a given Uquery are
    U0—Distinct: categories, keys to join to Mx segment
    Mx—non-Distinct: measures, categories (if any in Mx), keys to join to all U0 segments
  This last rule can allow for cardinality independence.

Figure 13:
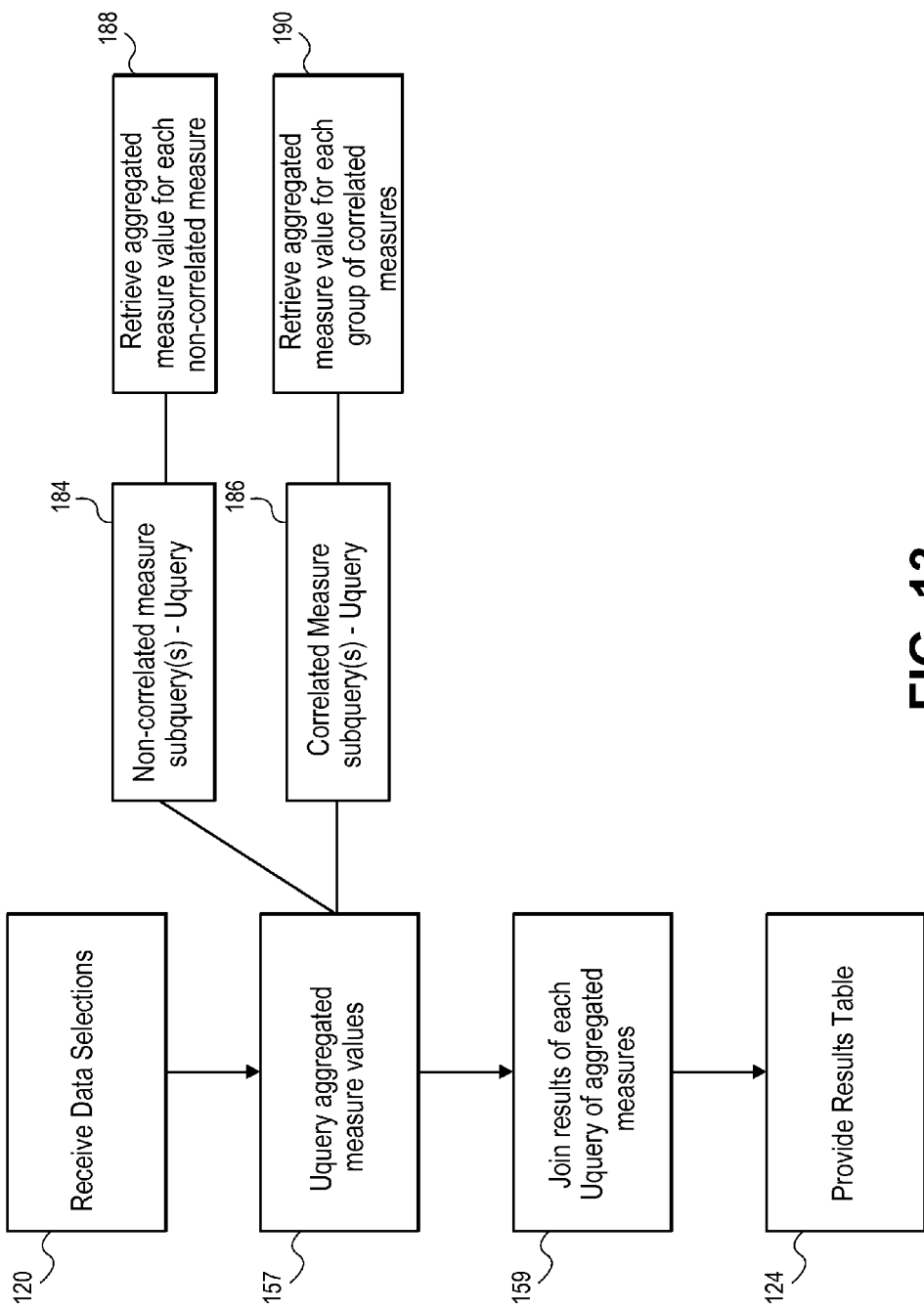
FIGS. 13 and 14 are flow diagrams depicting example methods for generating data results in the case where Uqueries are executed to produce aggregated measure values.

FIG. 13 depicts an example process that the query generation architecture may execute to generate data results in the case where Uqueries are executed to produce aggregated measure values. Non-correlated measure subquery(s) are generated and executed (step 184). Correlated measure subquery(s) are generated and executed (step 186). The results from the non-correlated measure subquery(s) and correlated measure sub-query(s) are joined as a results table (step 159). In particular, the non-correlated measure subquery(s) involves gathering aggregated measure values of each non-correlated measure (step 188). The correlated measure subquery(s) involves gathering aggregated measure values for each group of correlated measures (step 190).

Figure 14:
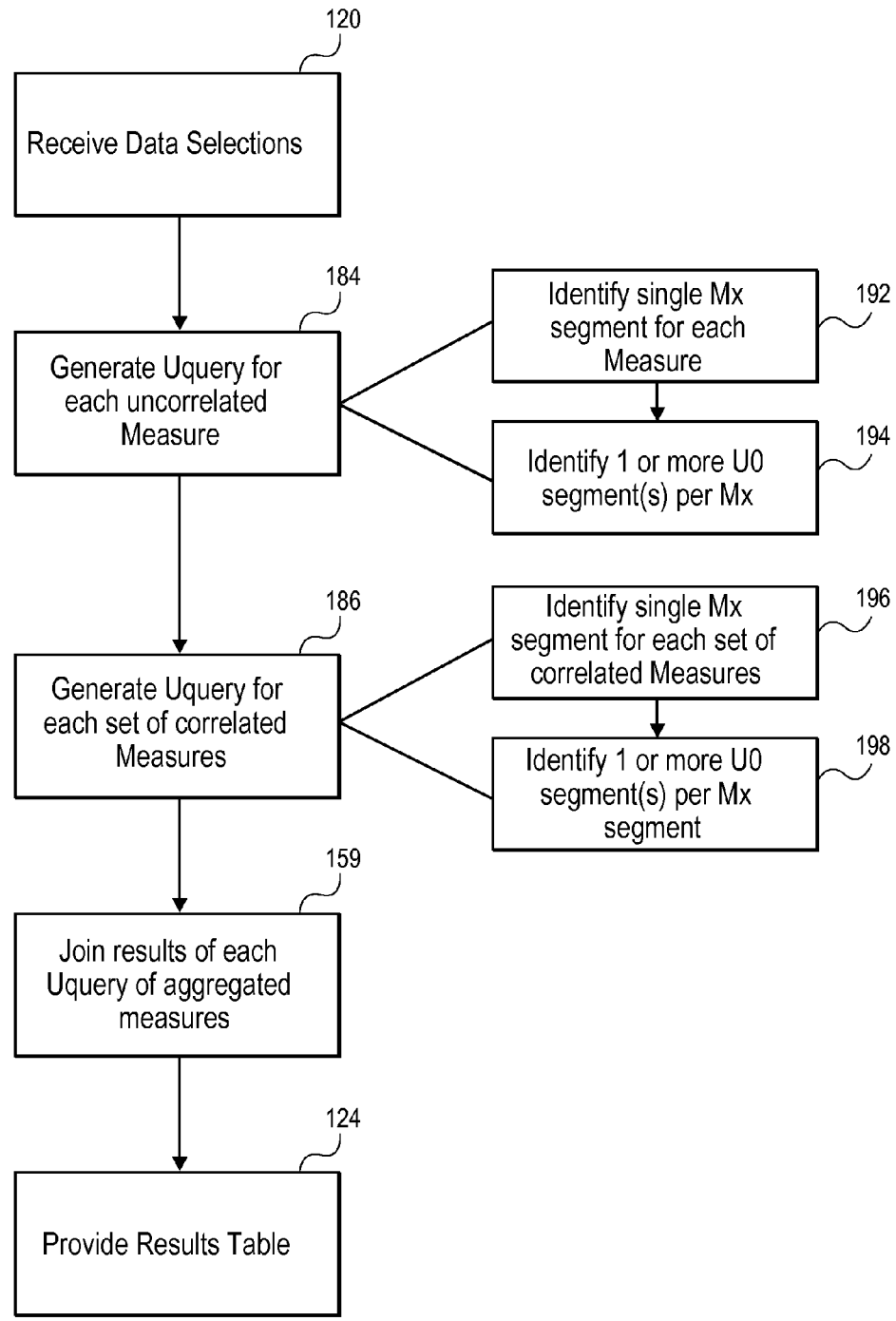

FIG. 14 depicts another example process that the query generation architecture may execute to generate data results in the case where Uqueries are executed to produce aggregated measure values. After receiving data selections (step 120), the architecture generates a Uquery for each uncorrelated measure (step 184) and each correlated measure (step 186). In this example process, generating a Uquery for each uncorrelated measure involves identifying a single Mx segment for each measure (step 192) followed by identifying 1 or more U0 segment(s) per Mx segment (step 194). Similarly, generating a Uquery for each set of correlated measures involves identifying a single Mx segment for each set of correlated measures (step 196) followed by identifying 1 or more U0 segment(s) per Mx segment (step 198). The results from the non-correlated measure subquery(s) and correlated measure sub-query(s) are joined as a results table (step 159).

Depicted in FIGS. 15A-15D are example data mart information maps that identify the data tables that may be included in the Mx segment and U0 segment subqueries. The data selection items for the data marts in this example include the following:

Data Selection Items:

| | | |
|---|---|---|
| C1:Category | postal_code | |
| M1:Measure | avg((to_street_num−from_street_num)/2) | as avg_street_num |
| M2:Measure | sum(from_street_num) | as sum_from_num |
| M3:Measure | sum(unit_sales_price) | as sum_sales |
| M4:Measure | sum(salary) | as sum_salary |
| F1:Filter | county_id | |

In the example data mart information maps depicted in FIGS. 15A-15D, the data selections also include the following associations. Each measure is independent of other measures. Each measure is dependent on the filter. With these data selections there are four Uqueries—one for each independent measure.

Figure 15A:
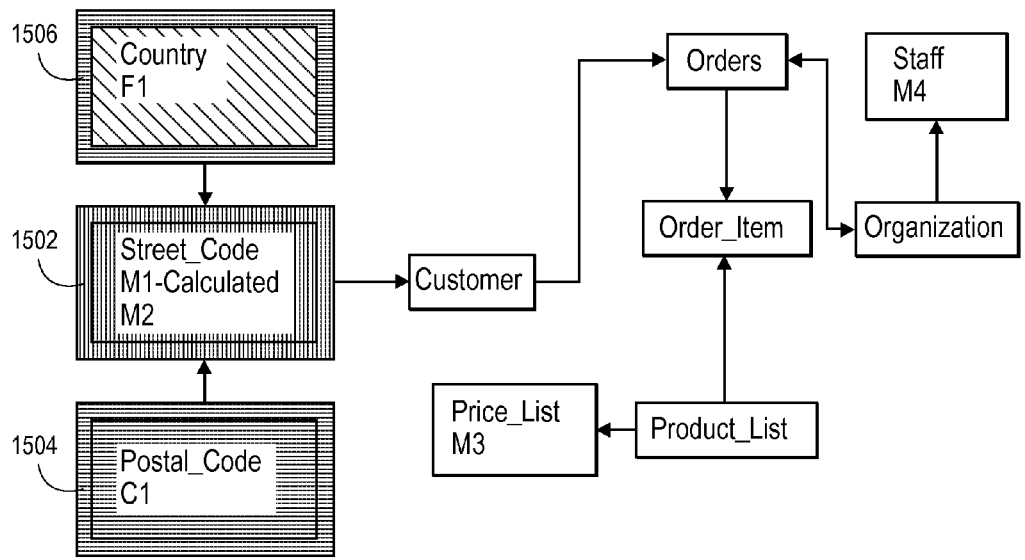

FIG. 15A identifies the tables included in the Uquery for the M1 measure. The Uquery for M1 includes 1 Mx segment and 2 U0 segments. The Mx segment includes the Street_Code table 1502 because the M1 measure is included in that measure table. One U0 segment includes the Postal_Code 1504 table because the C1 Category is in that table. The other U0 segment includes the Country table 1506 because the F1 filter is included in that dependent filter table.

Figure 15B:
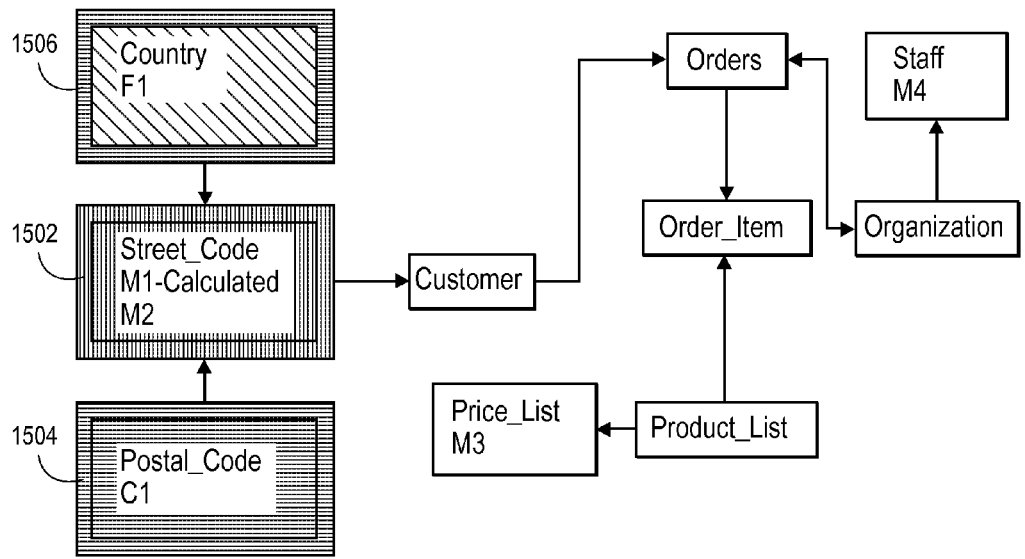

FIG. 15B identifies the tables included in the Uquery for the M2 measure. The Uquery for M2 includes 1 Mx segment and 2 U0 segments. The Mx segment includes the Street_Code table 1502 because the M2 measure is included in that measure table. One U0 segment includes the Postal_Code table 1504 because the C1 Category is in that table. The other U0 segment includes the Country table because the F1 filter is included in that dependent filter table.

Figure 15C:
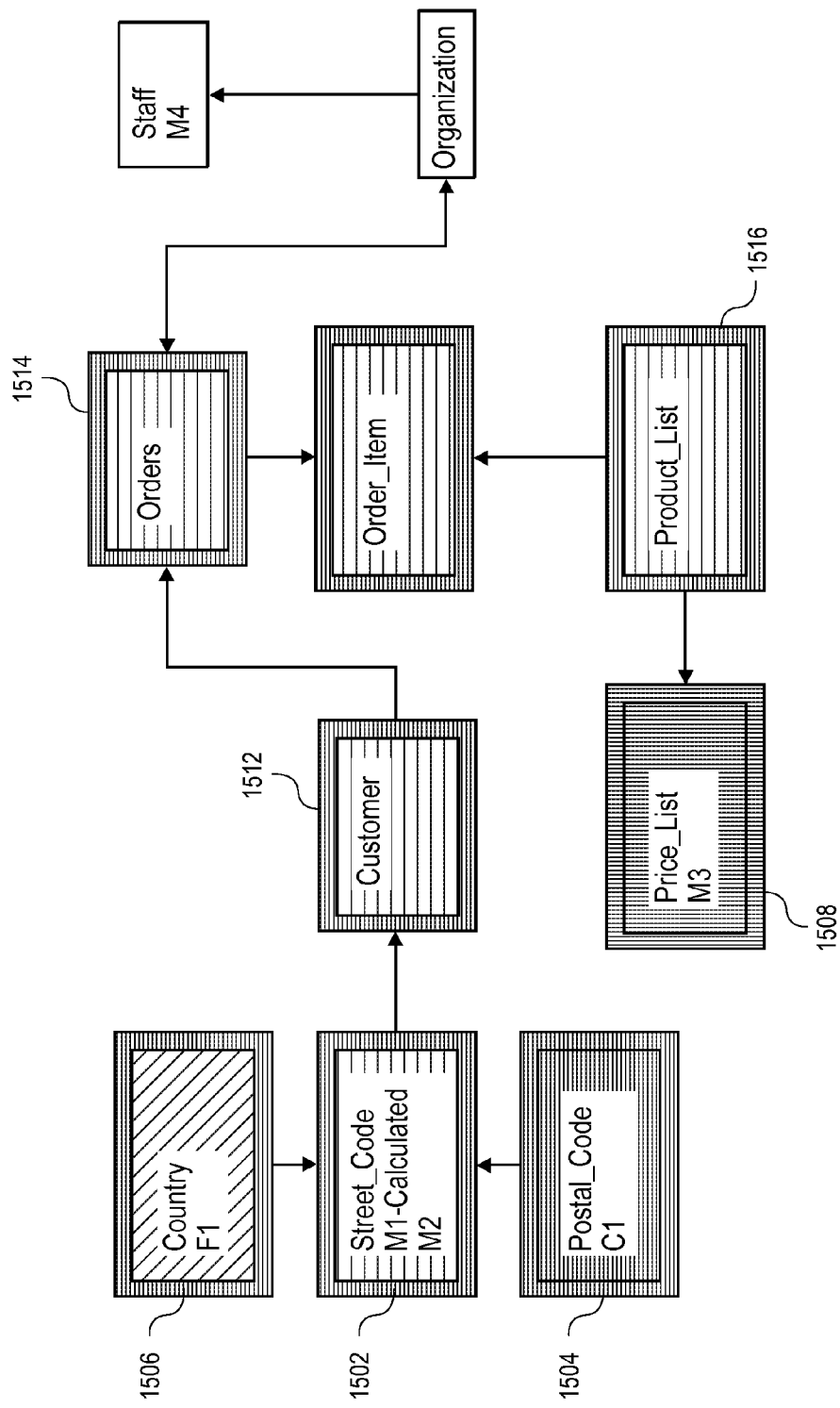

FIG. 15C identifies the tables included in the Uquery for the M3 measure. The Uquery for M3 includes 1 Mx segment and 1 U0 segment. The Mx segment includes the Price_List table 1508 because the M3 measure is included in that measure table. The U0 segment includes the Postal_Code table 1504 because the C1 Category is in that dependent category table. The U0 segment also includes the Street_Code, Customer, Orders, Order_Item, and Product_List tables (1502, 1512, 1514 and 1516 respectively) because those transfer tables are interposed between the dependent category table and the measure table. The U0 segment also includes the Country table 1506 because the F1 filter is included in that dependent filter table.

Figure 15D:
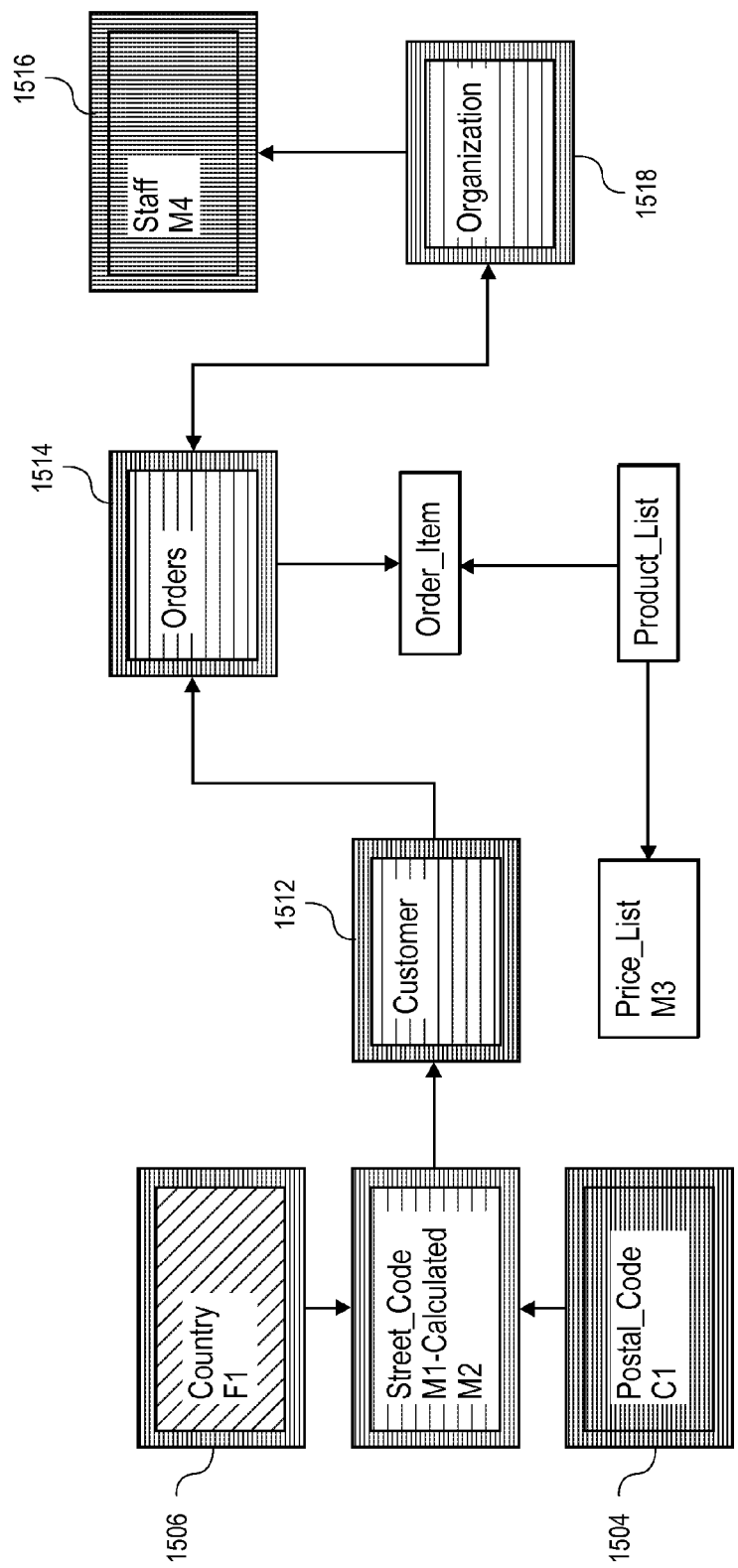

FIG. 15D identifies the tables included in the Uquery for the M4 measure. The Uquery for M4 includes 1 Mx segment and 1 U0 segment. The Mx segment includes the Staff table 1516 because the M4 measure is included in that measure table. The U0 segment includes the Postal_Code table 1504 because the C1 Category is in that dependent category table. The U0 segment also includes the Street_Code, Customer, Orders, and Organization tables (1502, 1512, 1514 and 1518, respectively) because those transfer tables are interposed between the dependent category table and the measure table.

The U0 segment also includes the Country table 1506 because the F1 filter is included in that dependent filter table.

Depicted in FIGS. 16A-16C are example data mart information maps that identify the data tables that may be included in the Mx segment and U0 segment subqueries. The data selection items for the data marts in this example include the following:

Data Selection Items:

| | | |
|---|---|---|
| C1:Category | postal_code | |
| M1:Measure | avg((to_street_num−from_street_num)/2) | as avg_street_num |
| M2:Measure | sum(from_street_num) | as sum_from_num |
| M3:Measure | sum(unit_sales_price) | as sum_sales |
| M4:Measure | sum(salary) | as sum_salary |
| F1:Filter | county_id | |

In the example data mart information maps depicted in FIGS. 16A-16C, the data selections also include the following associations. M1 is Dependent on M4 and F1 (but M4 is not Dependent on M1), M3 and M4 are Correlated and Dependent on F1, and M2 is Independent of everything (all M's and F1). With these data selections there are three Uqueries—one each for M1, M2, and the correlated set of M3 and M4.

FIG. 16A identifies the tables included in the Uquery for the M1 measure. The Uquery for M1 includes 1 Mx segment and 3 U0 segments. The Mx segment includes the Street_Code table 1602 because the M1 measure is included in that measure table. One U0 segment includes the Postal_Code table 1604 because the C1 Category is in that table. A second U0 segment includes the Country table 1606 because the F1 filter is included in that dependent filter table. A third U0 segment includes the Staff table 1616 because the dependent M4 measure is in that dependent measure table. The third U0 segment also includes the Customer, Orders, and Organization tables (1612, 1614 and 1618, respectively) because those transfer tables are interposed between the dependent measure table and the measure table.

FIG. 16B identifies the tables included in the Uquery for the M2 measure. The Uquery for M2 includes 1 Mx segment and 1 U0 segment. The Mx segment includes the Street_Code table 1602 because the M2 measure is included in that measure table. The U0 segment includes the Postal_Code table 1604 because the C1 Category is in that table. No other U0 segments are needed because M2 is independent of other measures and filters.

FIG. 16C identifies the tables included in the Uquery for the set of correlated M3 and M4 measures. The Uquery for correlated set includes 1 Mx segment and 1 U0 segment. The Mx segment includes the Price_List table 1630 because the M3 measure is included in that measure table. The Mx segment also includes the Staff table 1616 because the M4 measure is included in that measure table. Additionally, the Mx segment includes the Product_List, Order_Item, Orders, and Organization tables 1632, 1634, 1614 and 1618, respectively) because those transfer tables are interposed between the Price_List and Staff measure tables 1630, 1616. The U0 segment includes the Postal_Code table 1604 because the C1 Category is in that dependent category table. The U0 segment also includes the Country table 1606 because the F1 filter is included in that dependent filter table. The U0 segment also includes the Street_Code and Customer tables 1602, 1612 because those transfer tables are interposed between the dependent category table and the tables included in Mx.

FIGS. 17A and 17B depict examples of systems that may be used to perform a query in a database system. For example, FIG. 17A depicts an example of a system 800 that includes a standalone computer architecture where a processing system 802 (e.g., one or more computer processors) includes a database management application 804 being executed on it. The processing system 802 has access to a computer-readable memory 806 in addition to one or more data stores 808. The one or more data stores 808 may include tables 810, 812 upon which the query operation is to be performed.

FIG. 17B depicts a system 820 that includes a client server architecture. One or more user PCs 822 access one or more servers 824 running a database management program 826 on a processing system 827 via one or more networks 828. The one or more servers 824 may access a computer readable memory 830 as well as one or more data stores 832. The one or more data stores 832 may contain tables 834, 836 upon which the query operation is to be performed.

FIG. 18 shows a block diagram of an example of hardware for a standalone computer architecture 850, such as the architecture depicted in FIG. 17A that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A processor-implemented method for performing a query, comprising:
  receiving an identification of data item components and an identification of an association between the data item components, wherein the data item components include a measure and a category, and wherein the identified association indicates that the measure is independent of another data item component, indicates that the measure is dependent on another data item component, or indicates that two or more data item components are correlated;
  creating a database query for retrieving data item components, wherein the database query includes a first Uquery, wherein the first Uquery includes a Mx segment subquery and a U0 segment subquery, wherein the Mx segment subquery is operable to gather measures and is associated with an Mx segment table that contains the measure included in the data item components, columns for a calculated measure, or correlated measures, and wherein the U0 segment subquery is associated with a table that contains the category, a table that contains columns for a calculated category, a dependent measure table, or a dependent filter table, and wherein the U0 segment subquery further facilitates selecting a set of categories and join keys, the join keys of the set including join keys that join directly to the Mx segment subquery;
  executing the Mx segment subquery to generate Mx segment subquery results;
  executing the U0 segment subquery to generate U0 segment subquery results; and
  joining the Mx segment subquery results with the U0 segment subquery results to generate Uquery results.

2. The method of claim 1 further comprising:
  generating Uquery results for a second Uquery;
  generating a virtual results table by aggregating the Uquery results from the first Uquery with Uquery results from the second Uquery; and
  reporting the virtual results table.

3. The method of claim 2, wherein generating the virtual results table includes joining the Uquery results from the first Uquery with Uquery results from the second Uquery.

4. The method of claim 2, wherein generating the virtual results table includes unioning the Uquery results from the first Uquery with Uquery results from the second Uquery and applying an aggregating query to the unioned results to generate the virtual results table.

5. The method of claim 2, wherein the data item components further include a filter and further comprising receiving an identified association that indicates that a data item component is dependent on the filter.

6. The method of claim 2, wherein the data item components further include a filter and further comprising receiving an identified association that indicates that a data item component is not dependent on the filter.

7. The method of claim 2, further comprising receiving an identified association that indicates that a data item component is not dependent on the category.

8. The method of claim 2, further comprising receiving an identified association that indicates that a category is independent of a measure.

9. The method of claim 2, further comprising receiving an identified association that indicates that a category is independent of a filter.

10. The method of claim 2, wherein multiple cardinality exists between tables associated with the Uqueries.

11. The method of claim 1, wherein the first Uquery includes multiple U0 subquery segments.

12. The method of claim 11, wherein results from the multiple U0 subquery segments are joined with the Mx segment results.

13. A processor-implemented method for performing a query, comprising:
  receiving an identification of data item components and an identification of associations between the data item components, wherein the data item components include measures and a category, and wherein the identified associations include at least two different associations from the associations comprising an indication that one measure is independent of other measures, an indication that one measure is dependent on another measure, and an indication that two or more measures are correlated;

creating a database query for retrieving data item components, wherein the database query includes a first Uquery, wherein the first Uquery includes a Mx segment subquery and a U0 segment subquery, wherein the Mx segment subquery is operable to gather measures and is associated with an Mx segment table that contains the measures included in the data item components, columns for a calculated measure, or correlated measures, and wherein the U0 segment subquery is associated with a table that contains the category, a table that contains columns for a calculated category, a dependent measure table, or a dependent filter table, and wherein the U0 segment subquery further facilitates selecting a set of categories and join keys, the join keys of the set including join keys that join directly to the Mx segment subquery;

executing each Mx segment subquery to generate Mx segment subquery results;

executing each U0 segment subquery to generate U0 segment subquery results;

joining Mx segment subquery results from each Uquery with the U0 segment subquery results from the same Uquery to generate Uquery results;

generating a virtual results table by aggregating the Uquery results from one Uquery with Uquery results from another Uquery; and reporting the virtual results table.

14. The method of claim 13, wherein the data item components further include a filter.

15. The method of claim 14, wherein the identified associations further include an indication that a measure is dependent on the filter.

16. The method of claim 15, wherein the identified associations further include an indication that a measure is not dependent on the filter.

17. The method of claim 13, wherein the identified associations further include an indication that a measure is not dependent on the category.

18. The method of claim 13, wherein at least one Mx segment subquery is associated with a table that contains a transfer table or a category table.

19. The method of claim 13, wherein at least one U0 segment subquery is associated with a transfer table between category tables or a transfer table between a category table and a measure table.

20. The method of claim 13, wherein at least one U0 segment subquery is associated with a dependent required table.

21. The method of claim 13, wherein generating the virtual results table includes joining the Uquery results with the results from another Uquery.

22. The method of claim 13, wherein generating the virtual results table includes unioning the Uquery results with the results from another Uquery and applying an aggregating query to the unioned results to generate the virtual results table.

23. A system for performing a query, comprising:
one or more data processors;
a computer-readable storage medium encoded with instructions for commanding the one or more data processors to execute operations including:
receiving an identification of data item components and an identification of an association between the data item components, wherein the data item components include a measure and a category, and wherein the identified association indicates that the measure is independent of another data item component, indicates that the measure is dependent on another data item component, or indicates that two or more data item components are correlated;

creating a database query for retrieving data item components, wherein the database query includes a first Uquery, wherein the first Uquery includes a Mx segment subquery and a U0 segment subquery, wherein the Mx segment subquery is operable to gather measures and is associated with an Mx segment table that contains the measure included in the data item components, columns for a calculated measure, or correlated measures, and wherein the U0 segment subquery is associated with a table that contains the category, a table that contains columns for a calculated category, a dependent measure table, or a dependent filter table, and wherein the U0 segment subquery further facilitates selecting a set of categories and join keys, the join keys of the set including join keys that join directly to the Mx segment subquery;

executing the Mx segment subquery to generate Mx segment subquery results;

executing the U0 segment subquery to generate U0 segment subquery results; and joining the Mx segment subquery results with the U0 segment subquery results to generate Uquery results.

24. The system of claim 23, wherein the computer-readable storage medium is further encoded with instructions for commanding the one or more data processors to execute operations including:
generating Uquery results for a second Uquery;
generating a virtual results table by aggregating the Uquery results from the first Uquery with Uquery results from the second Uquery; and
reporting the virtual results table.

25. The system of claim 24, wherein generating the virtual results table includes joining the Uquery results from the first Uquery with Uquery results from the second Uquery.

26. The system of claim 24, wherein generating the virtual results table includes unioning the Uquery results from the first Uquery with Uquery results from the second Uquery and applying an aggregating query to the unioned results to generate the virtual results table.

27. The system of claim 24, wherein the data item components further include a filter and further comprising an identified association that indicates that a data item component is dependent on the filter.

28. The system of claim 24, wherein the data item components further include a filter and further comprising an identified association that indicates that a data item component is not dependent on the filter.

29. The system of claim 24, wherein the computer-readable storage medium is further encoded with instructions for commanding the one or more processors to receive an identified association that indicates that a data item component is not dependent on the category.

30. The system of claim 24, wherein the computer-readable storage medium is further encoded with instructions for commanding the one or more processors to execute receive an identified association that indicates that a category is independent of a measure.

31. The system of claim 24, wherein the computer-readable storage medium is further encoded with instructions for commanding the one or more processors to receive an identified association that indicates that a category is independent of a filter.

32. The system of claim 24, wherein the instructions allow for multiple cardinality to exist between tables associated with the Uqueries.

33. The system of claim 23, wherein the instructions allow for the first Uquery to include multiple U0 subquery segments.

34. The system of claim 33, wherein the instructions provide for results from the multiple U0 subquery segments to be joined with the Mx segment results.

35. A non-transitory computer-readable storage medium comprising programming instructions for performing a query, the programming instructions to cause a processing system to execute operations comprising:

receiving an identification of data item components and an indication of an association between the data item components, wherein the data item components include a measure and a category, and wherein the identified association indicates that the measure is independent of another data item component, indicates that the measure is dependent on another data item component, or indicates that two or more data item components are correlated;

creating a database query for retrieving data item components, wherein the database query includes a first Uquery, wherein the first Uquery includes a Mx segment subquery and a U0 segment subquery, wherein the Mx segment subquery is operable to gather measures and is associated with an Mx segment table that contains the measure included in the data item components, columns for a calculated measure, or correlated measures, and wherein the U0 segment subquery is associated with a table that contains the category, a table that contains columns for a calculated category, a dependent measure table, or a dependent filter table, and wherein the U0 segment subquery further facilitates selecting a set of categories and join keys, the join keys of the set including join keys that join directly to the Mx segment subquery;

executing the Mx segment subquery to generate Mx segment subquery results;

executing the U0 segment subquery to generate U0 segment subquery results; and joining the Mx segment subquery results with the U0 segment subquery results to generate Uquery results.

* * * * *